US009755980B2

(12) United States Patent
Chen et al.

(10) Patent No.: US 9,755,980 B2
(45) Date of Patent: Sep. 5, 2017

(54) DYNAMIC BANDWIDTH SCHEDULING METHOD AND DEVICE, AND COMPUTER STORAGE MEDIUM

(71) Applicant: ZTE Corporation, Shenzhen, Guangdong (CN)

(72) Inventors: Xue Chen, Shenzhen (CN); Shaoliang Luo, Shenzhen (CN); Hongxiang Guo, Shenzhen (CN); Xintian Hu, Shenzhen (CN); Gaofeng An, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/907,077

(22) PCT Filed: Jun. 17, 2014

(86) PCT No.: PCT/CN2014/080027
§ 371 (c)(1),
(2) Date: Jan. 22, 2016

(87) PCT Pub. No.: WO2014/169884
PCT Pub. Date: Oct. 23, 2014

(65) Prior Publication Data
US 2016/0366064 A1 Dec. 15, 2016

(30) Foreign Application Priority Data
Jul. 23, 2013 (CN) .......................... 2013 1 0310875

(51) Int. Cl.
*H04L 12/841* (2013.01)
*H04L 12/733* (2013.01)
(Continued)

(52) U.S. Cl.
CPC .............. *H04L 47/28* (2013.01); *H04L 41/12* (2013.01); *H04L 45/20* (2013.01);
(Continued)

(58) Field of Classification Search
None
See application file for complete search history.

(56) References Cited

U.S. PATENT DOCUMENTS 7,286,759 B1 * 10/2007 Sridhar ............... H04J 14/0227
398/43
2003/0185229 A1 10/2003 Shachar
(Continued)

FOREIGN PATENT DOCUMENTS

CN 1777066 A 5/2006
CN 101212403 A 7/2008
(Continued)

OTHER PUBLICATIONS

International Search Report in international application No. PCT/CN2014/080027, mailed on Sep. 26, 2014.
(Continued)

*Primary Examiner* — Kevin C Harper
*Assistant Examiner* — Derrick V Rose
(74) *Attorney, Agent, or Firm* — Oppedahl Patent Law Firm LLC

(57) ABSTRACT

Embodiments of the present disclosure disclose a dynamic bandwidth scheduling method and device, and a computer storage medium. The method is applied to each node in an Optical Burst Transport ring-Network (OBTN) and includes that: when a target node serves as a master node, for each source node in the OBTN, when a timeslot is allocated for a connection from the source node to a certain destination node, a timeslot occupied by a destination node having the smallest hop count to a destination node configured currently is selected preferentially among timeslots in which there exists an Optical Burst (OB) where there has been no drop operation; and when the target node serves as a master node, a timeslot allocation result is converted into a band-
(Continued)

width map and the bandwidth map is sent to each slave node in the OBTN.

18 Claims, 9 Drawing Sheets

(51) Int. Cl.
*H04Q 11/00* (2006.01)
*H04L 12/24* (2006.01)

(52) U.S. Cl.
CPC . *H04Q 11/0066* (2013.01); *H04Q 2011/0064* (2013.01); *H04Q 2011/0092* (2013.01)

(56) References Cited

U.S. PATENT DOCUMENTS

| | | |
|---|---|---|
| 2004/0037301 A1 | 2/2004 | Shachar |
| 2006/0146888 A1 | 7/2006 | Den Hollander |
| 2011/0020004 A1* | 1/2011 | Cao .................. H04J 14/0221 398/79 |
| 2014/0178066 A1* | 6/2014 | Patel .................. H04B 10/27 398/45 |

FOREIGN PATENT DOCUMENTS

| | | |
|---|---|---|
| CN | 101557339 A | 10/2009 |
| CN | 101959083 A | 1/2011 |

OTHER PUBLICATIONS

English Translation of the Written Opinion of the International Search Authority in international application No. PCT/CN2014/080027, mailed on Sep. 26, 2014.

Supplementary European Search Report in European application No. 14784881.6, mailed on Jun. 13, 2016.

Ning Deng et al:"A novel optical burst ring network with optical-layer aggregation and flexible bandwidth provisioning",2011 Optical Fiber Communication Conference and Exposition and the National Fiber Optic Engineers Conference (OFC/NFOEC 2011) : Los Angeles,California, USA, Mar. 6-10, 2011 ,IEEE,Piscataway , NJ, USA, Mar. 6, 2011 ,pp. 1-3,XP031946433.

* cited by examiner

Fig. 2

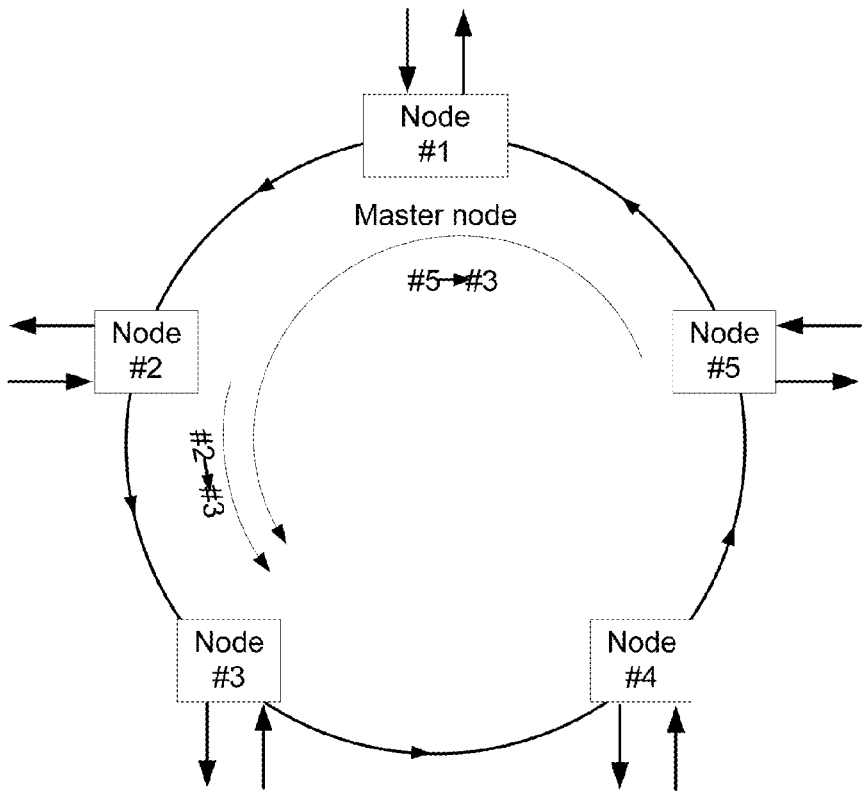

Fig. 3

| When a target node serves as a master node, for each source node in the OBTN, when a timeslot is allocated for a connection from the source node to a certain destination node, a timeslot occupied by a destination node having the smallest hop count to a destination node configured currently is selected preferentially among timeslots in which an OB where there has been no drop operation exists | 301 |

| When the target node serves as a master node, a timeslot allocation result is converted into a bandwidth map and the bandwidth map is sent to each slave node in the OBTN | 302 |

Fig. 13a

Timeslot number

|   | 1 | 2 | 3 | 4 | 5 | 6 | 7 | 8 | 9 | 10 |
|---|---|---|---|---|---|---|---|---|---|----|
| A |   |   |   |   |   |   |   |   |   |    |
| B |   |   |   |   Date frame |   |   |   |   |    |
| C |   |   |   |   |   |   |   | B |   |    |
| D | C |   |   | C | C | C |   |   | B | B  |
| E |   | C | B | B | B | D | D | D | D | D  |

Source node (vertical axis)

OB where there has been no drop operation

Fig. 13b

Timeslot number    kM+x

|    | 1  | 2 | 3 | ... | m | ... | M |
|----|----|---|---|-----|---|-----|---|
| #1 | -1 | 1 | 2 | ... | ▲ |     |   |
| #2 |    |   |   |     |   |     |   |
|    |    |   | Timeslot selection priority |   |   |   |   |
| :  |    |   |   |     |   |     |   |
| #N |    |   |   |     |   |     |   |

Destination node (vertical axis)

Fig. 14

When a target node serves as a master node, for each source node in the OBTN, when a timeslot is allocated for a connection from the source node to a destination node, a timeslot occupied by a destination node having the smallest hop count to a destination node configured currently is selected preferentially among timeslots in which an OB where there has been no drop operation exists — 1401

When the target node serves as a master node, a timeslot allocation result is converted into a bandwidth map and the bandwidth map is sent to each slave node in the OBTN — 1402

DYNAMIC BANDWIDTH SCHEDULING METHOD AND DEVICE, AND COMPUTER STORAGE MEDIUM

TECHNICAL FIELD

The present disclosure relates to the technical field of network communications, particularly to a dynamic bandwidth scheduling method and device, and a computer storage medium.

BACKGROUND

The rapid expansion of communication services are facilitating more and more users to access and use broadband services that are emerging one after another. In the meanwhile, the proportion of Internet Protocol (IP) services that are growing explosively is also increasing in communication networks, which evidently changes traffic characteristics of the communication networks, and dominant traditional voice services having relatively steady traffic in communication services are gradually replaced by data packet services with frequent traffic bursts, thereby greatly increasing network demands for flexible large capacity bandwidth allocation. In view of a development trend of service interfaces and optical transceiver technologies, a future optical network should be able to dynamically and flexibly provide different transmission rates and sub-wavelength level all optical switching capabilities of different bandwidth granularities.

A novel Optical Burst Transport ring-Network (OBTN), which is able to not only well adapt to bursts of data services, but also effectively reduce strict requirements of an all optical network on optical devices, is fully feasible with a flexible networking capability. FIG. 1 shows a network topology of an OBTN, in which a data channel consists of several wavelengths (in which the wavelengths are $\lambda 0$, $\lambda 1, \ldots \lambda N$, where N is a positive integer) used for carrying optical burst data, a control channel applies an independent wavelength $\lambda c$ to carry control information including bandwidth allocation, timeslot synchronization and so on, a data frame and a control frame are processed separately at respective network nodes, and a network node receives and sends a service correspondingly for the data frame according to control information. Optionally, each OBTN network node applies a fixed wavelength transmitter and a tunable wavelength receiver.

The OBTN uses a burst as the smallest network switching unit. Each burst is composed of two parts, a Burst Control Packet (BCP) and a Burst Data Packet (BDP), both of which are transmitted separately on physical channels. After acquiring control information, a network node can implement all optical switching or transparent transmission of the data packet without waiting for acknowledgement. Such a method of separating a control channel and a data channel not only largely simplifies switching of burst data, but also avoids a defect that a current optical buffer technology is immature, and reduces the complexity in implementing a network node.

The key to implement the OBTN based on medium sharing is to provide a highly efficient Medium Access Control (MAC) technology, i.e. a dynamic resource scheduling mechanism. At present, the OBTN generally applies token access or a random access method based on collision detection, both of which are, technically, distributed control management. However, a distributed MAC technology is easy to cause contention collision of burst data packets, thus resulting in waste of bandwidth resources of the optical burst ring network. Besides, it is also necessary to add a proper control protocol to the distributed MAC technology so as to provide fairness guarantee, and a processing time delay of a network node for control information is added preferably.

In fact, a centralized MAC technology based on timeslot division can better improve the network performance. A node in the ring network is selected as a master node, and other nodes are slave nodes. The master node is responsible for major functions of a control plane, mainly including: gathering bandwidth requests of nodes of the whole network, allocating bandwidths according to related resources, updating and delivering a bandwidth map and so on; and a slave node correspondingly receives and sends the bandwidth map delivered by the master node. In a centralized control solution, all bandwidth scheduling strategies are controlled by the master node, which can consider network resources comprehensively, improve the utilization ratio of bandwidths to the largest extent, provide fairness guarantee and reduce collision and contention.

Due to ring network characteristics of the OBTN, dynamic bandwidth resource scheduling at the master node needs to consider the influence of a cross master node service, wherein the cross master node service refers to a data packet that needs to pass the master node before being received on a source node and transmitted to a corresponding destination node to be transmitted, while a non-cross master node service refers to a data packet that does not need to pass the master node after being received on a source node and before being transmitted to a corresponding destination node to be transmitted. Taking FIG. 2 as an example, a slave node Node5 receives, at a certain moment T1 according to a current bandwidth map, a data service transmitted to a destination node Node3, and after a period of time $\delta$, a control frame containing a bandwidth map arrives at a master node Node1 again. At the moment, the master node allocates bandwidths according to new bandwidth requests. Thus, after the control frame containing the latest bandwidth map is delivered from Node1, Node2 may also receive, at the timeslot m according to the latest bandwidth map, the data service sent to the destination node Node3. However, a data service sent by Node5 to Node3 at the timeslot m of a data frame has not yet been transmitted at the moment, and the two will have collision inevitably. Even if Node2 does not receive the data service sent to Node3 at the timeslot m, Node3 will receive the service according to the new bandwidth map when the control frame and the data frame arrive at Node3, and it is also possible that a data service sent by Node5 at the timeslot T1 will not be acquired.

SUMMARY

Embodiments of the present disclosure disclose a dynamic bandwidth scheduling method and device, and a computer storage medium, which may be applied to an OBTN, so as to solve the problem of collision of dynamic resource scheduling in a timeslot division and centralized control-based OBTN.

The technical solutions of the embodiments of the present disclosure are implemented by the following way.

A dynamic bandwidth scheduling method is provided by an embodiment of the present disclosure, applied in a node in an OBTN, including that:

when a target node serves as a master node, for each source node in the OBTN, when allocating a timeslot for a connection from the source node to a destination node, the target node preferentially selects, among timeslots in which there exists an Optical Burst (OB) where there has been no drop operation, a timeslot occupied by a destination node having a smallest hop count to a destination node configured currently, and when the target node serves as a master node, a timeslot allocation result is converted into a bandwidth map and the bandwidth map is sent to each slave node in the OBTN.

Preferably, when the target node serves as a master node, a bandwidth is authorized for a connection from each source node to a destination node according to bandwidth requests of nodes of a whole network.

Preferably, the step that a bandwidth is authorized for a connection from each source node to a destination node according to the bandwidth requests of the nodes of the whole network may include that:

the master node acquires a bandwidth request matrix according to the bandwidth requests of the nodes of the whole network, wherein element $A_{ij}$ in the bandwidth request matrix represents a bandwidth request of node i to node j in the OBTN, i and j are positive integers smaller than or equal to N, and N is a total number of nodes in the OBTN;

the master node reduces authorization for the bandwidth request matrix according to existing bandwidth resources, so as to acquire a bandwidth authorization matrix, wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, a sum of authorized bandwidths of elements of each line is smaller than or equal to a maximum line rate; for each column in the bandwidth authorization matrix, a sum of authorized bandwidths of all elements in an upper triangular part of the column, and a sum of authorized bandwidths of all elements in a lower triangular part of the same column in a bandwidth authorization matrix received a period of a ring length ago are smaller than or equal to the maximum line rate.

Preferably, the step that the master node reduces the authorization for the bandwidth request matrix according to the existing bandwidth resources may include that:

the master node reduces the bandwidth request matrix by lines, and reduces a matrix acquired after the line reduction by columns.

Preferably, the step that the master node reduces the bandwidth request matrix by lines may include that: for each line in the bandwidth request matrix, whether a sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate; and the step that the master node reduces the matrix acquired after the line reduction by columns may include that: for each column in the matrix acquired after the line reduction, whether a sum of elements in a lower triangular part of the column exceeds a difference between the maximum line rate and a preset amount of reserved bandwidths of the column is judged on one hand, and if the sum of elements in a lower triangular part of the column exceeds the difference between the maximum line rate and the preset amount of reserved bandwidths of the column, bandwidths are reallocated for the elements in the lower triangular part of the column until an acquired sum of the elements in the lower triangular part of the column is smaller than or equal to the difference between the maximum line rate and the preset amount of reserved bandwidths of the column, and whether a sum of elements in an upper triangular part of the column exceeds a maximum amount of authorized bandwidths of the upper triangular part of the column is judged on the other hand, and if the sum of elements in an upper triangular part of the column exceeds the maximum amount of authorized bandwidths of the upper triangular part of the column, bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

Preferably, a step that the master node reduces the bandwidth request matrix by columns may include that: for each column in the bandwidth request matrix, whether a sum of elements in a lower triangular part of the column exceeds a difference between the maximum line rate and a preset amount of reserved bandwidths of the column is judged on one hand, and if the sum of elements in a lower triangular part of the column exceeds the difference between the maximum line rate and the preset amount of reserved bandwidths of the column, then bandwidths are reallocated for the elements in the column until an acquired sum of the elements in the lower triangular part of the column is smaller than or equal to the difference between the maximum line rate and the preset amount of reserved bandwidths of the column; and whether a sum of elements in an upper triangular part of the column exceeds a maximum amount of authorized bandwidths of the upper triangular part of the column is judged on the other hand, and if the sum of elements in an upper triangular part of the column exceeds the maximum amount of authorized bandwidths of the upper triangular part of the column, bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago; and a step that the master node reduces a matrix acquired after the column reduction by lines may include that: for each line in the matrix acquired after the column reduction, whether a sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate.

Preferably, the step that the master node reduces the bandwidth request matrix by lines may include that: for each line in the bandwidth request matrix, whether a sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate;

the step that the master node reduces the bandwidth request matrix by columns may include that:

for each column in the bandwidth request matrix, whether a sum of elements in a lower triangular part of the column exceeds a difference between the maximum line rate and a preset amount of reserved bandwidths of the column is judged on one hand, and if the sum of elements in a lower triangular part of the column exceeds the difference between the maximum line rate and the preset amount of reserved bandwidths of the column, bandwidths are reallocated for the elements in the lower triangular part of the column until an acquired sum of the elements in the lower triangular part of the column is smaller than or equal to the difference between the maximum line rate and the preset amount of reserved bandwidths; and whether a sum of elements in an upper triangular part of the column exceeds a maximum amount of authorized bandwidths of the upper triangular part of the column is judged on the other hand, and if the sum of elements in an upper triangular part of the column exceeds the maximum amount of authorized bandwidths of the upper triangular part of the column, bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago; and when the bandwidth authorization matrix is determined, a smaller one of values of an element at a same location in a matrix acquired after the line reduction and a matrix acquired after the column reduction is taken as a value of an element at a corresponding location in the bandwidth authorization matrix.

Preferably, the method may further include that:

after determining a value of each element in the bandwidth authorization matrix, the master node scans the bandwidth authorization matrix line by line and column by column, increases a value of an element at an intersection of a line in which a sum of elements in the line is smaller than the maximum line rate and a column in which a sum of elements in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column; increases a value of an element at an intersection of a line and a column, wherein the line is a line in which a sum of elements included is smaller than the maximum line rate, and the column satisfies that a sum of elements in a lower triangular part in the bandwidth authorization matrix is smaller than a difference between the maximum line rate and a preset amount of reserved bandwidths of the column, and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

Preferably, the step that bandwidths are reallocated for the elements in the column may include that:

bandwidths are allocated for the elements in the column by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority; and the step that bandwidths are reallocated for the elements in the line may include that:

bandwidths are allocated for the elements in the line by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority.

Preferably, the method may further include that:

after bandwidths are allocated for the elements in the column or in the line by using the non-assured bandwidth allocation manner, if there are still remaining bandwidths in the column or in the line, the remaining bandwidths are allocated to an unsaturated connection in the column or in the line in a polling manner accordingly, and 1 OB is allocated during each polling, wherein the unsaturated connection is a connection having a smaller amount of existing authorized bandwidths than an amount of actual requested bandwidths.

Preferably, wherein the method may further include that:

when timeslots are allocated, the master node configures, according to a sorting sequence of nodes in an OBTN ring, the timeslots in order by respectively taking the nodes as source nodes starting from the master node;

wherein a configuration sequence of destination nodes under each source node is that: according to the sorting sequence of the nodes in the OBTN ring, the timeslots are configured in turn from a destination node having a small hop count to the source node to a destination node having a large hop count to the source node.

Preferably, the method may further include that:

when a timeslot is allocated for a connection from the source node to a certain destination node, if there are more than two timeslots occupied by the destination node having a smallest hop count to the destination node configured currently, a timeslot having the smallest timeslot number is selected preferentially among timeslots in which an OB which has not yet been transmitted exists.

Preferably, the method may further include that:

when the target node serves as a slave node, the target node synthesizes a bandwidth map received currently and a cross ring bandwidth map to acquire a received map, and receives a corresponding data frame according to the received map, wherein the cross ring bandwidth map is a bandwidth map received by the target node a period of a ring length ago; and in the received map, element $R_{nm}=j$ represents that target node n at timeslot m receives an OB sent by source node j; in a prime number bandwidth map, element $A_{nm}=i$ represents that source node n sends an OB to target node i at timeslot m, and m, n, i and j are positive integers, wherein the step that the bandwidth map received currently and the cross ring bandwidth map are synthesized to acquire the received map may include that:

the cross ring bandwidth map is scanned line by line or column by column, and for each element in the cross ring bandwidth map, if a value of the element is smaller than a line number of a line where the element locates, the line number of the element is taken as a value of an element which takes the value of the element and a column number of the element in the received bandwidth map respectively as a line number and a column number; and the bandwidth map received currently is scanned line by line or column by column, and for each element in the bandwidth map, if a value of the element is larger than a line number of a line where the element locates, the line number of the element is taken as a value of an element which takes the value of the element and a column number of the element in the received bandwidth map respectively as a line number and a column number.

Preferably, the method may further include that:

when a control frame and a corresponding data frame arrives at a node in the OBTN simultaneously, the node delays the received data frame through a Fiber Delay Line (FDL), wherein delay time is longer than or equal to time for the node to process the control frame.

An embodiment of the present disclosure further provides a dynamic bandwidth scheduling device of an OBTN, applied on a master node in the OBTN, and including:

a timeslot configuring module configured to, for each source node in the OBTN, when allocating a timeslot for a connection from the source node to a destination node, preferentially select, among timeslots in which an OB which has not yet been transmitted exists, a timeslot occupied by a destination node having a smallest hop count to a destination node configured currently, and a bandwidth map converting module configured to convert a timeslot allocation result acquired by the timeslot configuring module into a bandwidth map and send the bandwidth map to each slave node in the OBTN.

Preferably, the device may further include:

a bandwidth authorization matrix generating module configured to acquire a bandwidth request matrix according to bandwidth requests of nodes of a whole network, wherein element $A_{ij}$ in the bandwidth request matrix represents a bandwidth request of node i to node j in the OBTN, i and j are positive integers smaller than or equal to N, and N is a total number of nodes in the OBTN; and an authorization reducing module, configured to reduce authorization for the bandwidth request matrix according to existing bandwidth resources, so as to acquire a bandwidth authorization matrix, wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, a sum of authorized bandwidths of elements of each line is smaller than or equal to a maximum line rate; for each column in the bandwidth authorization matrix, a sum of authorized bandwidths of all elements in an upper triangular part of the column, and a sum of authorized bandwidths of all elements in a lower triangular part of the same column in a bandwidth authorization matrix received a period of a ring length ago are smaller than or equal to the maximum line rate.

Preferably, the authorization reducing module may include:

a line reducing unit, configured to reduce the bandwidth request matrix by lines; and a column reducing unit, configured to reduce a matrix acquired after the line reduction by columns.

Preferably, the line reducing unit may include: a first judging sub-unit configured to, for each line in the bandwidth request matrix, judge whether a sum of elements in the line exceeds the maximum line rate; and a first allocating sub-unit configured to, when a judging result of the first judging sub-unit is the sum of elements in the line exceeds the maximum line rate, reallocate bandwidths for the elements in the line until an acquired sum of the elements in the line is smaller than or equal to the maximum line rate; and the column reducing unit comprises: a second judging sub-unit configured to, for each column in the matrix acquired after the line reduction, judge whether a sum of elements in a lower triangular part of the column exceeds a difference between the maximum line rate and a preset amount of reserved bandwidths of the column, and a second allocating sub-unit configured to, when a judging result of the second judging sub-unit is the difference between the maximum line rate and a preset amount of reserved bandwidths of the column is exceeded, reallocate bandwidths for the elements in the lower triangular part of the column until an acquired sum of the elements in the lower triangular part of the column is smaller than or equal to the difference between the maximum line rate and the preset amount of reserved bandwidths of the column; and a third judging sub-unit configured to, for each column in the matrix acquired after the line reduction, judge whether a sum of elements in an upper triangular part of the column exceeds a maximum amount of authorized bandwidths of the upper triangular part of the column; and a third allocating sub-unit configured to, when a judging result of the third judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

Preferably, the line reducing unit may include: a fourth judging sub-unit configured to, for each line in a matrix acquired after the column reduction, judge whether a sum of elements in the line exceeds the maximum line rate; and a fourth allocating sub-unit configured to, when a judging result of the fourth judging sub-unit is the sum of elements in the line exceeds the maximum line rate, reallocate bandwidths for the elements in the line until an acquired sum of the elements in the line is smaller than or equal to the maximum line rate, wherein the column reducing unit comprises: a fifth judging sub-unit configured to, for each column in the bandwidth request matrix, judge whether a sum of elements in a lower triangular part of the column exceeds a difference between the maximum line rate and a preset amount of reserved bandwidths of the column, and a fifth allocating sub-unit configured to, when a judging result of the fifth judging sub-unit is the difference between the maximum line rate and a preset amount of reserved bandwidths of the column is exceeded, reallocate bandwidths for the elements in the column until an acquired sum of the elements in the lower triangular part of the column is smaller than or equal to the difference between the maximum line rate and the preset amount of reserved bandwidths of the column;

a sixth judging sub-unit configured to, for each column in the bandwidth request matrix, judge whether a sum of elements in an upper triangular part of the column exceeds a maximum amount of authorized bandwidths of the upper triangular part of the column, and a sixth allocating sub-unit configured to, when a judging result of the sixth judging sub-unit is the sum of elements in an upper triangular part of the column exceeds a maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

Preferably, the authorization reducing module may further include:

an authorization synthesizing unit configured to, when the bandwidth authorization matrix is determined, take a smaller one of values of an element at a same location in a matrix acquired after the line reduction and a matrix acquired after the column reduction as a value of an element at a corresponding location in the bandwidth authorization matrix;

the line reducing unit comprises: a seventh judging sub-unit configured to, for each line in the bandwidth request matrix, judge whether a sum of elements in the line exceeds the maximum line rate, and a seventh allocating sub-unit configured to, when a judging result of the seventh judging sub-unit is the sum of elements in the line exceeds the maximum line rate, reallocate bandwidths for the elements in the line until an acquired sum of the elements in the line is smaller than or equal to the maximum line rate;

the column reducing unit comprises: an eighth judging sub-unit configured to, for each column in the bandwidth request matrix, judge whether a sum of elements in a lower triangular part of the column exceeds a difference between the maximum line rate and a preset amount of reserved bandwidths of the column, and an eighth allocating sub-unit configured to, when a judging result of the eighth judging sub-unit is the sum of elements in a lower triangular part of the column exceeds a difference between the maximum line rate and a preset amount of reserved bandwidths of the column, reallocate bandwidths for the elements in the lower triangular part of the column until an acquired sum of the elements in the lower triangular part of the column is smaller than or equal to the difference between the maximum line rate and the preset amount of reserved bandwidths;

a ninth judging sub-unit configured to judge, for each column in the bandwidth request matrix, whether a sum of elements in an upper triangular part of the column exceeds a maximum amount of authorized bandwidths of the upper triangular part of the column, and a ninth allocating sub-unit configured to, when a judging result of the ninth judging sub-unit is the sum of elements in an upper triangular part of the column exceeds a maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

Preferably, the authorization synthesizing unit may include:

a scanning sub-unit configured to, after determining a value of each element in the bandwidth authorization matrix, scan the bandwidth authorization matrix line by line and column by column;

a first increasing sub-unit, configured to increase a value of an element at an intersection of a line in which a sum of elements in the line is smaller than the maximum line rate and a column in which a sum of elements in an upper triangular part in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column;

a second increasing sub-unit, configured to increase a value of an element at an intersection of a line in which a sum of elements in the line is smaller than the maximum line rate, and a column in which a sum of elements in a lower triangular part in the column is smaller than a difference between the maximum line rate and a preset amount of reserved bandwidths of the column, and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

Preferably, the timeslot configuring module may be further configured to, when timeslots are allocated, configure according to a sorting sequence of nodes in an OBTN ring, the timeslots in order by respectively taking the nodes as source nodes starting from the master node; and is further configured to determine a configuration sequence of destination nodes under each source node as follows: according to the sorting sequence of the nodes in the OBTN ring, the timeslots are configured in turn from a destination node having a small hop count to the source node to a destination node having a large hop count to the source node.

Preferably, the timeslot configuring module may be further configured to, when a timeslot is allocated for a connection from the source node to a certain destination node, preferentially select, among timeslots in which an OB which has not yet been transmitted exists, a timeslot having a smallest timeslot number if there are more than two timeslots occupied by the destination node having a smallest hop count to the destination node configured currently.

An embodiment of the present disclosure further provides a computer storage medium. The computer storage medium stores a computer executable instruction and the computer executable instruction is used for executing the dynamic bandwidth scheduling method.

After applying the present disclosure, efficient and collision-free dynamic resource scheduling in an OBTN may be implemented and the collision involved in cross master node services can be completely solved without interrupting the services. The present disclosure not only can allocate bandwidth resources fairly and reasonably and respond to a bandwidth requirement of a burst service rapidly, but also can realize collision-free exchange of data, channel space reuse and strict Quality of Service (QoS) guarantee and can obtain a relatively high bandwidth utilization rate.

BRIEF DESCRIPTION OF THE DRAWINGS

FIG. 2 is a diagram of a topological structure of an OBTN having 5 nodes in the related art;

FIG. 3 is a flowchart of a dynamic bandwidth scheduling method of an OBTN in an embodiment of the present disclosure;

FIG. 13a and FIG. 13b are respectively description of an example of sorting timeslot priority and graphical representation of timeslot selection priority according to an embodiment of the present disclosure;

FIG. 14 is a flowchart of a dynamic bandwidth scheduling method according to an embodiment of the present disclosure.

DETAILED DESCRIPTION

Figure 1:
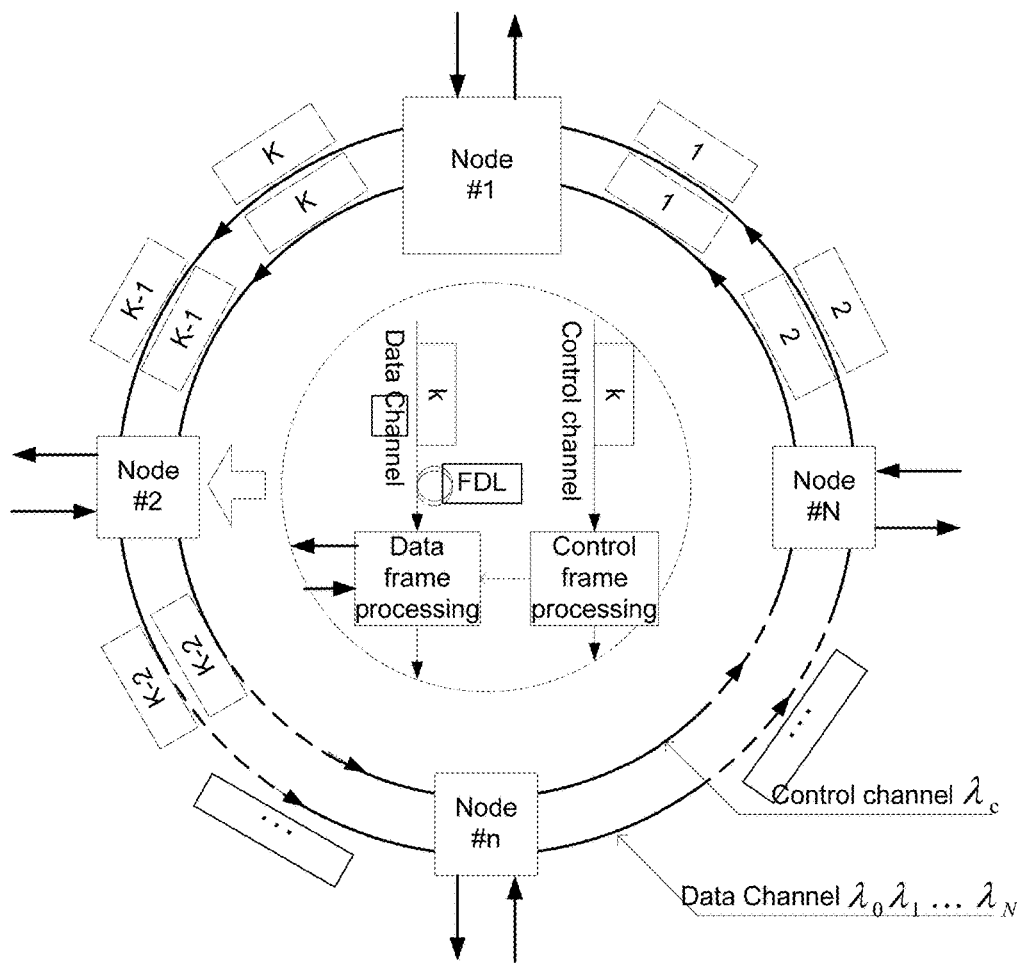
FIG. 1 is a schematic diagram of an OBTN in the related art.

The embodiments of the present disclosure will be expounded hereinafter with reference to the accompanying drawings so that the purposes, technical solutions and advantages of the present disclosure are clearer. It needs to be noted that the embodiments in the present application and the characteristics in the embodiments may be randomly combined with each other if there is no conflict.

An embodiment of the present disclosure records a dynamic bandwidth scheduling method of an OBTN, applied to each node in the OBTN, as shown in FIG. 3, and including the following steps.

Step 301: When a target node serves as a master node, for each source node in the OBTN, when a timeslot is allocated for a connection from the source node to a certain destination node, a timeslot occupied by a destination node having the smallest hop count to a destination node configured currently is selected preferentially among timeslots in which an OB which has not yet been transmitted exists.

Step 302: When the target node serves as a master node, a timeslot allocation result is converted into a bandwidth map and the bandwidth map is sent to each slave node in the OBTN.

Besides, when the node serves a master node, a bandwidth is further allocated for a connection from each source node to a destination node according to bandwidth requests of nodes of the whole network.

As an implementation mode, the step that a bandwidth is authorized for a connection from each source node to a destination node according to the bandwidth requests of the nodes of the whole network may be implemented by the following steps.

Step 10: The master node (i.e. the target node) acquires bandwidth requests of slave nodes from information of a control frame, and combines the bandwidth requests to acquire a bandwidth request matrix, wherein element $A_{ij}$ in the bandwidth request matrix represents a bandwidth request of node i to node j in the OBTN, i and j are positive integers smaller than or equal to N, and N is the total number of the nodes in the OBTN. In the bandwidth request matrix, elements of the $i^{th}$ line represent bandwidth requests of node i in the OBTN to the nodes in the OBTN, and elements of the $i^{th}$ column represent bandwidth requests of the nodes in the OBTN to node i.

Step 20: The master node reduces authorization for the bandwidth request matrix according to existing bandwidth resources, so as to acquire a bandwidth authorization matrix.

The bandwidth authorization matrix determines the size of an authorized bandwidth between any two nodes in the OBTN, i.e. the number of authorized OBs, wherein the authorization reduction includes line reduction and column reduction. The line reduction includes that bandwidths of the bandwidth request matrix are constrained line by line. When the total number of bandwidth requests of a certain line exceeds a maximum line rate of the line, it is necessary to reallocate bandwidths for elements in the line, so that the total number of bandwidth requests in the line acquired after the line reduction is smaller than or equal to the maximum line rate. The bandwidth request matrix may be divided into an upper triangular part and a lower triangular part, wherein the upper triangular part contains bandwidth requests of non-cross master node services and the lower triangular part contains bandwidth requests of cross master node services. Accordingly, the column reduction includes that, for each column in the bandwidth request matrix, bandwidths are constrained with respect to the total number of the bandwidth requests of the upper triangular part and the total number of the bandwidth requests of the lower triangular part in the column. When the total number of the bandwidth requests of the upper triangular part or the lower triangular part in the column exceeds a maximum amount of authorized bandwidths, it is necessary to reallocate bandwidths for elements in the part of the column, so that the total number of the bandwidth requests of the part in the column acquired after the column reduction is smaller than or equal to the maximum amount of authorized bandwidths. The authorization reduction is performed so as to ensure that transmission of a source node and reception of a destination node in the OBTN are not beyond the limitation from the maximum line rate. Particularly, the following bandwidth allocation methods may be applied when the line reduction and the column reduction are performed: a combination of fixed bandwidth allocation, assured bandwidth allocation and non-assured bandwidth allocation, thus providing sufficient fairness guarantee and QoS guarantee, wherein for each column in the bandwidth request matrix, a maximum amount of authorized bandwidths of a lower triangular part of the column is the difference between the maximum line rate and a preset amount of reserved bandwidths of the column, and the maximum amount of authorized bandwidths of an upper triangular part of the column is the difference between the maximum line rate and an actual amount of authorized bandwidths of a lower triangular part of the same column in a bandwidth authorization matrix received a period of a ring length ago.

Figures 4, 5:
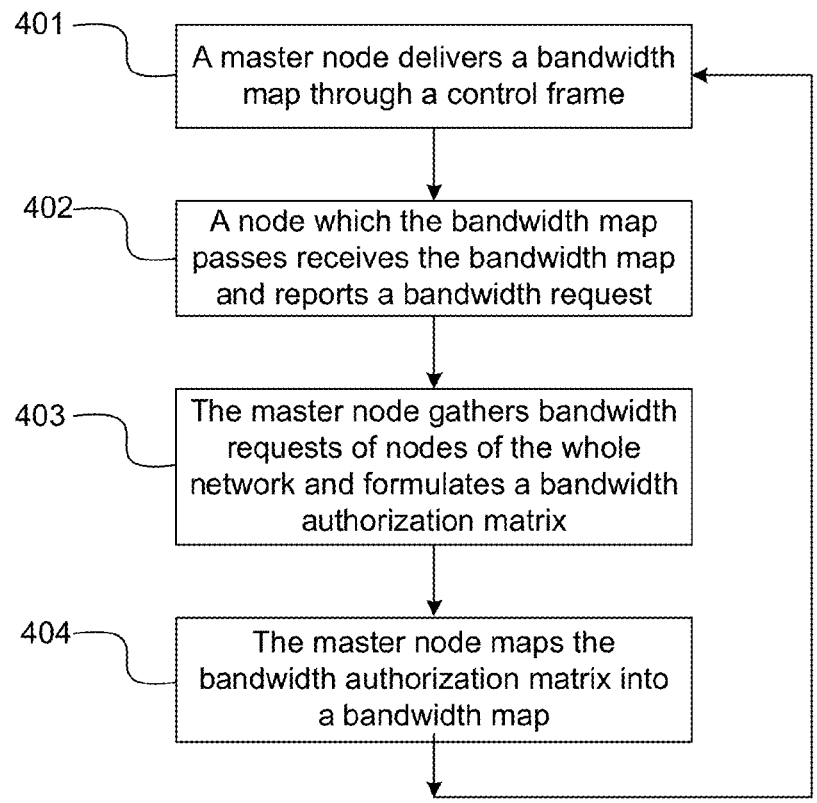
FIG. 4 is graphical representation of a data frame and a bandwidth map according to an embodiment of the present disclosure.
FIG. 5 is a flowchart of a dynamic bandwidth scheduling method of an OBTN.

Step 30: The master node uses a timeslot configuration method to map the bandwidth authorization matrix as a timeslot allocation list, i.e. a bandwidth map. The form of the bandwidth map is a two-dimensional matrix. As shown in FIG. 4, provided that the value of a certain element $B_{mn}$ in the two-dimensional matrix is k, it is indicated that node m at timeslot n has an OB sent to node k. The timeslot configuration method is a "sequential configuration" method, and the core concept thereof includes that: (1) source nodes are configured sequentially, and nodes starting from the master node are taken as source nodes in turn according to a sorting sequence of the nodes in the OBTN so as to configure timeslots; (2) target nodes are configured sequentially, and when timeslots are configured for each source node, timeslots occupied by OBs sent by the source node to corresponding destination nodes are configured in turn from a destination node having a small hop count to the source node to a destination node having a large hop count to the source node according to a direction in which the OBTN operates; (3) when a timeslot is selected for each destination node, a timeslot occupied by a destination node having the smallest hop count to a destination node configured currently is selected preferentially among timeslots in which an OB which has not yet been transmitted exists.

An embodiment of the present disclosure further records a dynamic bandwidth scheduling device of an OBTN, applied on a master node in the OBTN, and including:

a timeslot configuring module configured to implement a process of mapping a bandwidth authorization matrix to a bandwidth map, and specifically configured to determine the locations of authorized timeslots of services sent by each source node to different destination nodes in a data frame;

a bandwidth map converting module, configured to convert a timeslot allocation result acquired by the timeslot configuring module into a bandwidth map and send the bandwidth map to each slave node in the OBTN.

Specifically, a method for configure timeslots sequentially requires that transmission timeslots of each source node are configured sequentially and source nodes are configured in a sequence consistent with a direction in which the OBTN operates. Configuration of transmission timeslots of each source node includes operations of a timeslot priority sorting unit and a timeslot configuring unit.

As an implementation mode, the timeslot configuring module may include:

a timeslot priority sorting unit, configured to determine the selection priority of timeslots that can be occupied by services sent by a current source node to different destination nodes, wherein the selection priority of the timeslots are sorted according to the following principle: in timeslots in which an OB which has not yet been transmitted exists, a timeslot occupied by a node serving as a destination node having the smallest hop count (i.e. the shortest distance) to a destination node configured currently has the highest selection priority. Particularly, if more than two timeslots have an OB which has not yet been transmitted and has the same hop count to the destination node configured currently, these timeslots have the same selection priority;

a timeslot configuring unit, configured to implement configuration of authorized timeslots sent from the current source node to different destination nodes. Specifically, each source node configures transmission timeslots for all destination nodes one by one according to the timeslot selection priority of different destination nodes, and for timeslot configuration of each destination node, if there are more than two timeslots having the same selection priority, the timeslots are not selected according to a fixed sequence in principle, and generally, a timeslot having a smaller timeslot number may be selected preferentially.

As an implementation mode, the device may further include:

a bandwidth authorization matrix generating module, configured to acquire a bandwidth request matrix according to bandwidth requests of nodes of the whole network, wherein element $A_{ij}$ in the bandwidth request matrix represents a bandwidth request of node i to node j in the OBTN, i and j are positive integers smaller than or equal to N, and N is the total number of the nodes in the OBTN; and an authorization reducing module, configured to reduce authorization for the bandwidth request matrix according to existing bandwidth resources, so as to acquire a bandwidth authorization matrix, thereby implementing a process of calculating the bandwidth authorization matrix by the bandwidth request matrix. Specifically, the size of an authorized bandwidth between any two nodes is determined according to existing bandwidth resources and actual bandwidth request information of each slave node.

As an implementation mode, the authorization reducing module may include:

a line reducing module, configured to primarily determine the sizes of authorized bandwidths transmitted from each source node to different destination nodes. Actually, each line of the bandwidth authorization matrix represents an authorized transmission bandwidth of a source node. Since a network node is only mounted with one fixed wavelength optical transmitter for carrying a data service and each timeslot can only receive one OB, a transmitted bandwidth of a source node is limited by a maximum line rate;

a column reducing unit, configured to primarily determine the sizes of authorized bandwidths of services received by each destination node from different source nodes. Actually, each column of the bandwidth authorization matrix represents an authorized receiving bandwidth of a corresponding destination node. Since a network node is only mounted with one tunable wavelength optical receiver and each timeslot can only transmit one OB, reception of a destination node is also limited by the maximum line rate.

Particularly, an upper triangular part and a lower triangular part of the bandwidth request matrix correspond to bandwidth requests of a non-cross master node service and a cross master node service of a data frame respectively. It is necessary to introduce a maximum authorized bandwidth amount calculating sub-unit in order to prevent starvation of the non-cross master node service caused by full occupation of the receiving capacity of a destination node by the cross master node service. The sub-unit is configured to determine the maximum amounts of authorized bandwidths of an upper triangular part and a lower triangular part in each column of the bandwidth authorization matrix. Preferably, the maximum authorized bandwidth amount calculating sub-unit applies the following strategy to determine the maximum amounts of authorized bandwidths of an upper triangular part and a lower triangular part in each column: for each column in a current bandwidth request matrix, the difference between the maximum line rate and an actual amount of authorized bandwidths of a lower triangular part of the same column in a bandwidth authorization matrix received a period of a ring length ago is taken as a maximum amount of authorized bandwidths of an upper triangular part of the column, while a maximum amount of authorized bandwidths of a lower triangular part of each column is the difference between the maximum line rate and a preset amount of reserved bandwidths for the column. Generally, a preset amount of reserved bandwidths for each column can at least ensure assured bandwidths of all connections on the corresponding column and preset amounts of reserved bandwidths for columns may be the same and may be also different.

As an implementation mode, the authorization reducing module may further include: an authorization synthesizing unit, configured to synthesize primary authorization results of connections having been subjected to line reduction and column reduction, and determine the bandwidth authorization matrix finally. Actually, centralized control-based bandwidth authorization of the OBTN faces a problem of bandwidth allocation of multiple sources and multiple destinations, and it is necessary to consider the limitation on transmission capability and the limitation on receiving capability at the same time. Since the same connection may obtain different authorization results after line reduction and column reduction are performed on the bandwidth request matrix respectively. Thus, the authorization synthesizing unit may select the minimum value of authorization acquired by the line reduction and the column reduction for the connection. When the value of a certain connection is the minimum value of authorization acquired by the line reduction and the column reduction, a line and a column where the connection locates may have surplus increment (i.e. the total quantity of bandwidths of the line where the connection locates is smaller than the maximum line rate, and the total quantity of bandwidths of an upper triangular part or a lower triangular part of the column where the connection locates is smaller than a corresponding maximum amount of authorized bandwidths). Authorized bandwidths may be supplemented to a connection at the intersection of a surplus column and a surplus line, and the connection with the supplemented authorized bandwidths cannot make the line where the connection locates get rid of the constraint of the maximum line rate, nor can the connection with the supplemented authorized bandwidths make the column where the connection locates get rid of the constraint of a maximum amount of authorized bandwidths.

Optionally, the authorization synthesizing unit of the authorization reducing module may be omitted without evidently reducing the total authorization amount of the bandwidth authorization matrix, and it is required at the moment that a column reducing object in the column reducing unit is a bandwidth request matrix having been subjected to line reduction, or a line reducing object in the line reducing unit is a bandwidth request matrix having been subjected to column reduction. In other words, the authorization reducing module performs line reduction and column reduction on the bandwidth request matrix successively to as to obtain the bandwidth authorization matrix.

To sum up, the dynamic bandwidth scheduling method of the OBTN according to the present embodiment mainly has the following characteristics: fairness guarantee and QoS guarantee are provided by the authorization reducing step, the timeslot configuration step provides a solution for collision appearing in a cross master node service, and reuses a channel space.

The technical solutions of the present disclosure will be further expounded below with reference to the accompanying drawings so that the technical methods and technical advantages of the present disclosure are clearer. It needs to be pointed out that the following embodiments should not become limitation to the present disclosure.

As shown in FIG. 2, provided that an OBTN includes 5 network nodes (actually, the number of network nodes may be set as required, and 5 network nodes are set in the present embodiment for example) distributed clockwise, in which Node1 is a master node responsible for centralized control management including bandwidth allocation and so on, and other nodes are slave nodes. In each Dynamic Bandwidth Allocation (DBA) period, the master node gathers bandwidth requests of the nodes of the whole network, then allocates bandwidths according to related resources, and updates and delivers bandwidth maps, while the slave nodes perform corresponding receiving and sending operations according to the bandwidth maps delivered by the master node. Preferably, the DBA period is defined as an updating interval of two adjacent DBAs performed by the master node. In the present embodiment, the DBA period may be equal to or smaller than a period of a ring length, thereby ensuring that the master node can respond to the dynamic bandwidth requests of the nodes of the whole network rapidly.

The OBTN applies a wavelength tuning mechanism of a Fixed Transmitter Tunable Receiver (FTTR). Each node in the ring network sends a data service on a fixed data wavelength, and tunes and receives a locally transmitted service in any data wavelength. Besides, each node is further mounted with a pair of an optical transmitter and an optical receiver with a fixed wavelength to send and receive control information on a control channel. The data wavelengths are divided into OBs with fixed lengths. Timeslots of different data wavelengths are kept synchronous and OBs of all data wavelengths in several burst timeslots form a data frame. Accordingly, a bandwidth map carried in a control frame is configured to indicate OB ownership at a timeslot of each wavelength of the data frame, and indication information should at least include information of a source node and a destination node of an OB.

Preferably, the data frame may be delayed by an FDL in order to prevent the control frame containing the bandwidth map and the data frame containing a data service from arriving at each node in the ring network synchronously, thereby ensuring that when the data frame arrives at a certain node, the node has completed processing the corresponding control frame, wherein an optimal delay duration of the FDL is the processing time of the node for the control frame. Photovoltaic conversion needs to be performed on the control frame at the node, at least including that: the bandwidth map is read, and receiving and sending operations of the node from and to the corresponding data frame are determined; the amount of local buffered data to be transmitted is written in a specific location of the control frame to report a bandwidth request, and after completing reading and writing processing for the control frame and receiving and sending the local data, the node synchronously sends the data frame and the control frame having been subjected to the photovoltaic conversion to a node of the next hop of the ring network.

It needs to be pointed out that the control frame and the data frame may actually choose to arrive at or depart from the node asynchronously. At the moment, the node may save the FDL, but it is necessary to set a reasonable offset time for the control frame and send the control frame before the data frame, so that for each node in the ring network, the control frame arrives before the corresponding data frame, and the corresponding control frame has been processed before the data frame arrives.

The control frame and the data frame return to the master node again after a circle, and the master node performs DBA according to the bandwidth requests of the nodes of the whole network, determines a new bandwidth map and delivers the same to the nodes of the whole network. The present disclosure will be further described below by application examples.

The present implementation example provides a dynamic bandwidth scheduling method of an OBTN based on the OBTN operation mechanism above, as shown in FIG. 5, including:

Step 401: A master node delivers a bandwidth map through a control frame and the bandwidth map at least includes OB transmission indication of each source node.

Specifically, in an FTTR mechanism, lines of the bandwidth map respectively represent timeslot transmission arrangement of each source node, and OB information at a timeslot is a destination node to which a service will be sent under a corresponding source node. The master node delivers a preset default bandwidth map as soon as a system starts. Generally, the default bandwidth map uniformly distributes timeslots of all wavelengths to connections of interconnected nodes of the whole network.

Step 402: During the process of delivering the bandwidth map, a node which the bandwidth map passes receives a service correspondingly according to a received bandwidth map. In the meanwhile, the node which the bandwidth map passes will also fill a local bandwidth request in a designated location of the control frame, and delivers the control frame to a node of the next hop.

Figure 6:
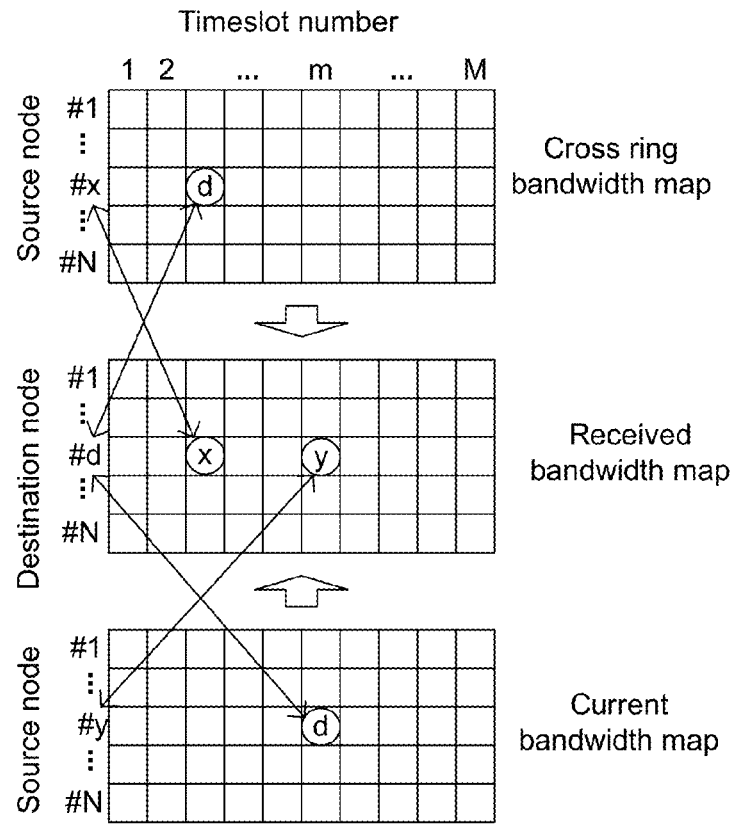
FIG. 6 is a flowchart of synthesizing a received bandwidth map according to an embodiment of the present disclosure.

Preferably, the step that the node which the bandwidth map passes receives the service correspondingly according to the received bandwidth map includes that: the node which the bandwidth map passes synthesizes a cross ring bandwidth map and the bandwidth map received currently so as to obtain a received map, and correspondingly receives the service according to the received map, wherein the cross map bandwidth map refers to a bandwidth map delivered by the master node in the last period of a ring length. The cross ring bandwidth map and the bandwidth map received currently have an overlapped timeslot. In the received map, an element of each line represents a receiving condition of each destination node. If element $R_{nm}$ in the received map is equal to j, it is indicated that destination node n receives at timeslot m an OB sent by source node j. Particularly, FIG. 6 shows a method for synthesizing the bandwidth map received currently and the cross ring bandwidth map, including that: provided that element $A_{nm}$=i in a bandwidth map received each time represents that source node n sends, at timeslot m, an OB to destination node i, when the received bandwidth map is synthesized, the cross ring bandwidth map is scanned line by line or column by column on one hand; for each element in the cross ring bandwidth map, if the value of the element is smaller than a line number of a line where the element locates, the line number of the line where the element locates is used as the value of an element which takes the value of the element and a column number of the element in the received bandwidth map respectively as a line number and a column number; on the other hand, the bandwidth map received currently is scanned line by line or column by column, for each element in the bandwidth map, if the value of the element is larger than a line number of a line where the element locates, the line number of the line where the element locates is used as the value of an element which takes the value of the element and a column number of the element in the received bandwidth map respectively as a line number and a column number.

Step 403: The control frame containing the bandwidth map returns to the master node again after a circle, the master node analyzes and gathers bandwidth requests of the nodes of the whole network, executes a step of reducing authorization, and formulates a bandwidth authorization matrix.

Preferably, the authorization reduction may include three sub-steps including line reduction, column reduction and authorization synthesis.

Firstly, the line reduction aims to satisfy the limitation on the transmission capability of each source node.

Secondly, the column reduction aims to satisfy the limitation on the receiving capability of each destination node.

Finally, the authorization synthesis aims to maximize an authorized bandwidth of a connection between any two nodes while satisfying the limitation on the transmission capability of a corresponding source node and the limitation on the receiving capability of a corresponding destination node. Optionally, the sub-step of authorization synthesis may be omitted without evidently reducing the total amount of authorized bandwidths.

Step 404: After the bandwidth authorization matrix is formulated, the master node maps the bandwidth authorization matrix into a bandwidth map through timeslot configuration. In other words, timeslots authorization for transmission from each source node to different destination nodes is configured in a proper timeslot in a bandwidth map through timeslot configuration. Particularly, the step of timeslot configuration requires that a data packet is sent and received without collision.

Step 401 is performed after Step 404.

Preferably, timeslots of each source node are configured in a sequence consistent with a direction in which the OBTN operates, and timeslot transmission of the master node is configured first. Destination nodes under each source node are also configured in a sequence consistent with the direction in which the OBTN operates, a node having the smallest hop count to the source node is configured first, and timeslot configuration of the next node is started only after all authorization configuration of the destination nodes is completed.

Preferably, the timeslot configuration step includes a timeslot priority sorting sub-step and a timeslot configuration sub-step.

Firstly, timeslots priority is sorted so as to determine the timeslot selection priority for transmission to different destination nodes under each source node, wherein those timeslots that contain an OB which has the smallest hop count to a destination node configured currently and has not yet been transmitted are selected preferentially to configure timeslots of different destination nodes.

Finally, proper timeslots are configured for authorization of transmission from a current source node to different destination nodes according to the timeslot selection priority determined according to the sorting of the timeslot priority of different destination nodes, and the bandwidth map is acquired finally.

Figure 7:
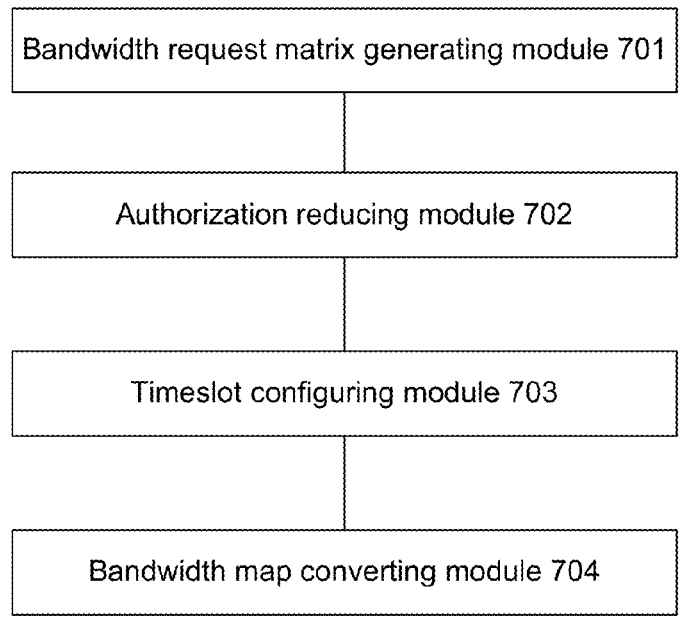
FIG. 7 is a structural diagram of a dynamic bandwidth scheduling device of an OBTN according to an embodiment of the present disclosure.

Accordingly, the present embodiment provides a dynamic bandwidth scheduling device of an OBTN based on the OBTN operating mechanism above. As shown in FIG. 7, the dynamic bandwidth scheduling device of the OBTN includes:

an authorization reducing module 701, configured to reduce authorization for the bandwidth request matrix according to existing bandwidth resources, so as to acquire a bandwidth authorization matrix;

a timeslot configuring module 702 configured to, for each source node in the OBTN, when allocating a timeslot for a connection from the source node to a destination node, preferentially select, among timeslots in which an OB which has not yet been transmitted exists, a timeslot occupied by a destination node having the smallest hop count to a destination node configured currently;

a bandwidth request matrix generating module 703, configured to acquire the bandwidth request matrix according to bandwidth requests of nodes of the whole network;

a bandwidth map converting module 704, configured to convert a timeslot allocation result acquired by the timeslot configuring module into a bandwidth map and send the bandwidth map to each slave node in the OBTN.

Figure 8:
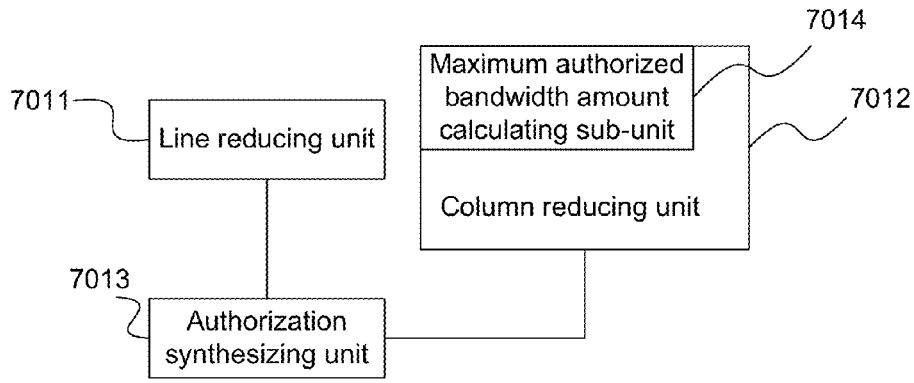
FIG. 8 is a schematic diagram of an authorization reducing module according to an embodiment of the present disclosure.
Figure 9A:
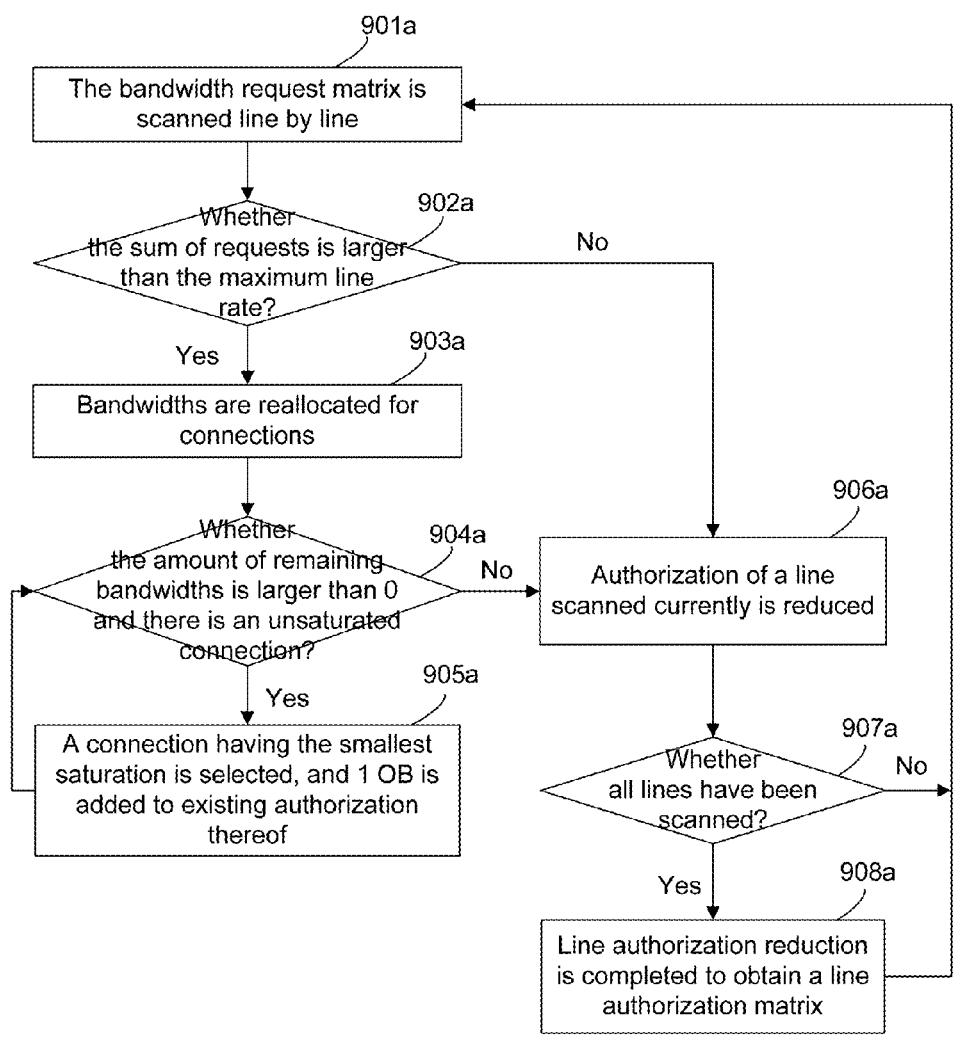
FIG. 9a to FIG. 9b are flowcharts of a line reducing flow and a column reducing flow according to an embodiment of the present disclosure.

FIG. 8 is a schematic diagram of the authorization reducing module 701, including a line reducing unit 7011, a column reducing unit 7012 and an authorization synthesizing unit 7013, wherein the line reducing unit 7011 is configured to reduce the bandwidth request matrix by lines;

the column reducing unit 7012 is configured to reduce a matrix acquired after the line reduction by columns; and the authorization synthesizing unit 7013 is configured to, when the bandwidth authorization matrix is determined, take a smaller one of values of an element at a same location in a matrix acquired after the line reduction and a matrix acquired after the column reduction as a value of an element at a corresponding location in the bandwidth authorization matrix;

The line reduction refers to reducing authorization for each line of the bandwidth request matrix, so as to ensure that the total amount of transmission bandwidths of source nodes is within the limitation of the maximum line rate. Particularly, a limit value of the transmission capability of each source node is the maximum line rate. FIG. 9a shows a flow of line reduction according to an embodiment of the present disclosure, including the following steps:

Step 901a: The bandwidth request matrix is scanned line by line.

Step 902a: Whether the sum of requests is larger than the maximum line rate is judged. If larger than the maximum line rate, Step 903a is performed. Otherwise, Step 906a is performed.

Step 903a: Bandwidths are reallocated for connections.

Step 904a: Whether the amount of remaining bandwidths is larger than 0 is judged. If larger than 0, Step 905a is performed. Otherwise, Step 906a is performed.

Step 905a: A connection having the smallest degree of saturation is selected, and 1 OB is added to related authorization thereof.

Step 906a: Authorization of a line scanned currently is reduced.

Step 907a: Whether all lines have been scanned is judged. If yes, Step 908a is performed. Otherwise, Step 901a is performed.

Step 908a: Line authorization reduction is completed.

Preferably, types of authorized bandwidths allocated for the connections in lines during the line reduction include: a fixed bandwidth, an assured bandwidth and a non-assured bandwidth, wherein an allocation weight of the non-assured bandwidth may be a Service-Level Agreement (SLA) or a size requested actually.

Preferably, since the minimum authorization unit of an authorized bandwidth is 1 OB in the present example, if the value of an authorized bandwidth allocated based on an allocation weight is not an integer when a non-assured bandwidth is allocated during the line reduction, the value of the authorized bandwidth allocated based on the allocation weight is rounded down. If there are still remaining bandwidths after all connections in a line have been allocated with non-assured bandwidths based on allocation weights, the remaining bandwidths are allocated to unsaturated connections on the line in a polling manner, and 1 OB is allocated during each polling, wherein the unsaturated connections refer to connections having less existing authorized bandwidths than bandwidths actually requested.

Figure 9B:
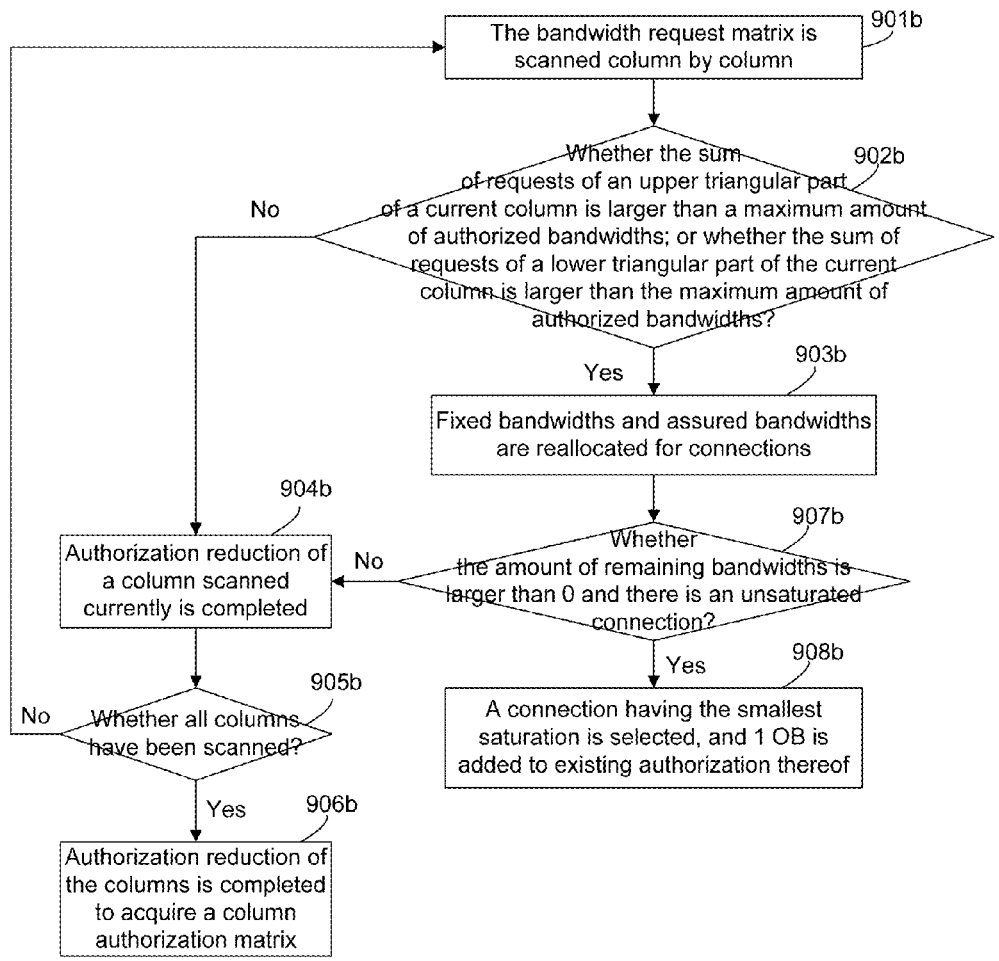

The column reduction refers to authorization reduction directed to each column of the bandwidth request matrix so as to ensure that the total amount of received timeslots of each destination node does not exceed the maximum line rate. A column reduction flow provided by the present example is as shown in FIG. 9b, including:

Step 901b: The bandwidth request matrix is scanned column by column.

Step 902b: Whether the following conditions are satisfied: the sum of requests of an upper triangular part of a current column is larger than a maximum amount of authorized bandwidths; or whether the sum of requests of a lower triangular part of the current column is larger than the maximum amount of authorized bandwidths? If yes, Step 903b is performed. Otherwise, Step 904b is performed.

Step 903b: Fixed bandwidths and assured bandwidths are reallocated for connections, and Step 907b is performed.

Step 904b: Authorization reduction directed to a column scanned currently is completed.

Step 905b: Whether all columns have been scanned? If yes, Step 906b is performed. Otherwise, Step 901b is performed.

Step 906b: Column authorization reduction is completed to acquire an authorization matrix.

Particularly, since each node in the ring network is based on a wavelength tuning mechanism of a FTTR, and burst data of only a certain wavelength can be tuned and received in each timeslot, i.e. each node is limited by a maximum receiving capability, it is necessary to consider a timeslot occupied by a service that has not yet been transmitted in a cross-ring frame each time when a bandwidth authorization matrix is formulated, wherein the cross ring frame refers to a data frame overlapped with a current bandwidth map and corresponding to the last period of a ring length.

Figure 10:
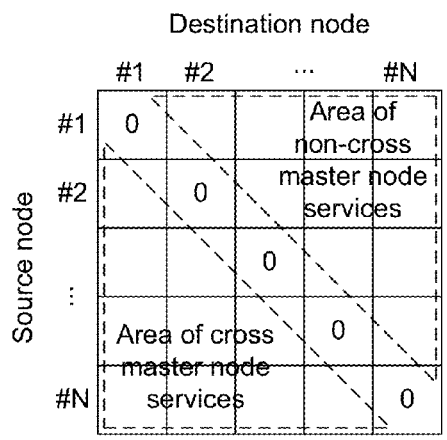
FIG. 10 is a schematic diagram of areas of a cross master node service and a non-cross master node service in a bandwidth authorization matrix according to an embodiment of the present disclosure.

It is indicated by analysis that received services of each node in the ring network include a non-cross master node service of a current frame and a cross master node service corresponding to a cross ring frame. As shown in FIG. 10, an upper triangular part and a lower triangular part of each column of an authorized matrix respectively represent an area of non-cross master node services and an area of cross master node services.

Preferably, reserved bandwidths should be provided for an upper triangular part of each column of the next cross ring frame each time when a bandwidth authorization matrix is formulated, so as to prevent "starvation" of a non-cross master node service of the next cross ring frame. In the meanwhile, remaining bandwidths of a lower triangular part of each column of a bandwidth authorization matrix a period of a ring length ago are allocated to an upper triangular part of a corresponding column of a current bandwidth authorization matrix. Accordingly, the column reducing unit 7012 may further include a maximum authorized bandwidth amount calculating sub-unit 7014 configured to, when a current bandwidth authorization matrix is formulated, obtain maximum amounts of authorized bandwidths of an upper triangular part and a lower triangular part of each column in the bandwidth authorization matrix.

Preferably, types of authorized bandwidths allocated for connections in a column during the column reduction include a fixed bandwidth, an assured bandwidth, and a non-assured bandwidth, wherein an allocation weight of the non-assured bandwidth may be an SLA or a size requested actually.

Preferably, since the minimum authorization unit of an authorized bandwidth is 1 OB in the present example, if the value of an authorized bandwidth allocated based on an allocation weight is not an integer when a non-assured bandwidth is allocated during the column reduction, the value of the authorized bandwidth allocated based on the allocation weight is rounded down. If there are still remaining bandwidths after all connections on a column have been allocated with non-assured bandwidths based on allocation weights, the remaining bandwidths are allocated to unsaturated connections on the column in a polling manner, and 1 OB is allocated during each polling, wherein the unsaturated connections refer to connections having less existing authorized bandwidths than bandwidths actually requested.

Figure 11:
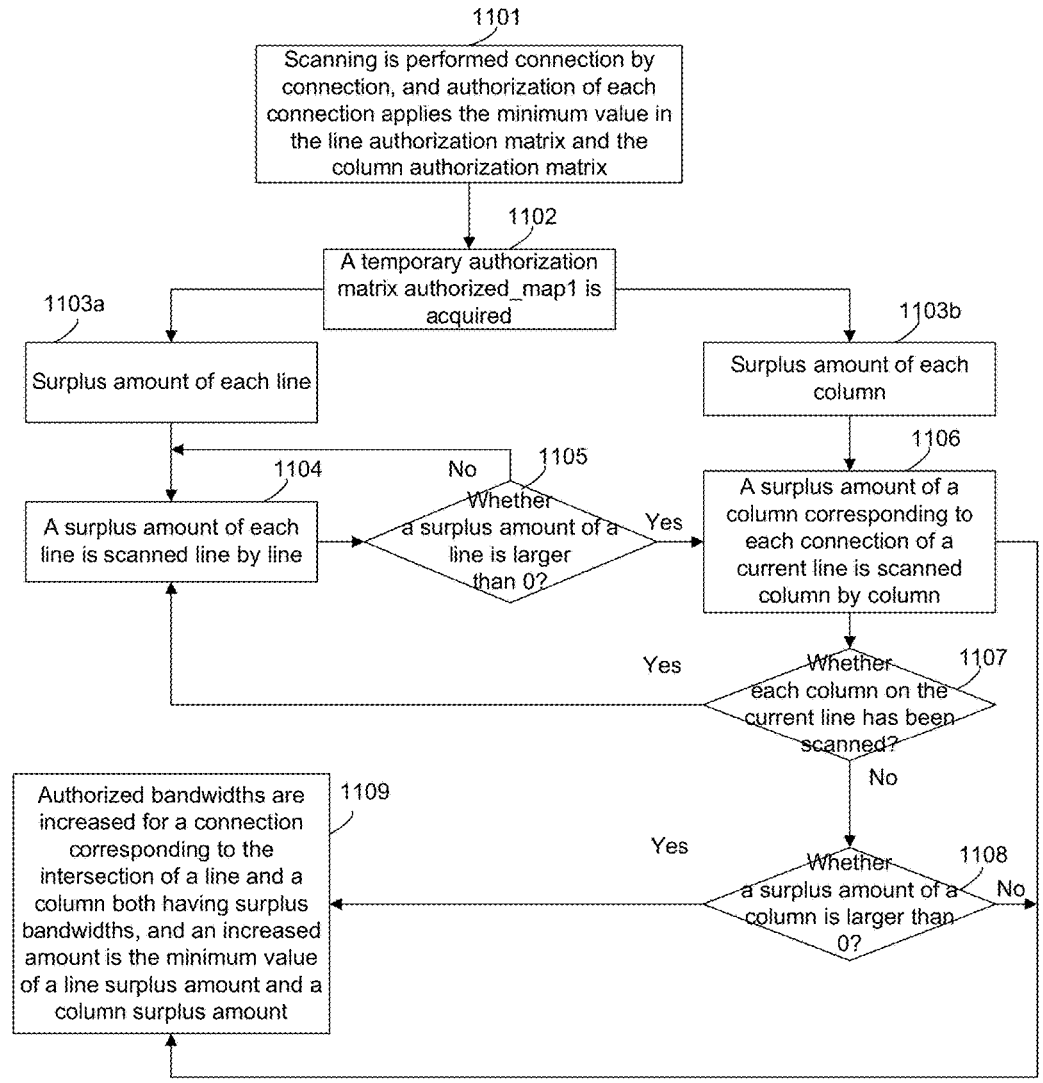
FIG. 11 is a flowchart of authorization synthesis according to an embodiment of the present disclosure.

After lines and columns are reduced respectively, the bandwidth request matrix has satisfied the limitation on the transmission capability of source nodes corresponding to each line and the limitation on the receiving capability of destination nodes of each column. However, since the OBTN has multiple sources and multiple destinations in full logic connection, authorization of each connection may directly affect the limitation on the transmission capability of a corresponding source node and the limitation on the receiving capability of a corresponding destination node, thus the authorization synthesizing unit 7013 needs to synthesize a line authorization matrix acquired by line reduction and a column authorization matrix acquired by column reduction. An authorization synthesizing flow provided by the present example is as shown in FIG. 11, including:

Step 1101: The line authorization matrix and the column authorization matrix are scanned line by line or column by column, and an authorized bandwidth of the same corresponding connection should apply the minimum authorization value in the line authorization matrix and the column authorization matrix.

The authorized bandwidth of the connection is enabled to satisfy the limitation on the transmission capability of a line where the connection locates and the limitation on the receiving capability of a column where the connection locates.

Step 1102: A temporary authorization matrix (authorized_map1) is acquired. Step 1103a and Step 1103b are performed.

Step 1103a: The difference between the temporary authorization matrix and an authorized line matrix is constructed to obtain a surplus vector of each line.

Step 1103b: The difference between the temporary authorization matrix and an authorized column matrix is constructed to obtain a surplus vector of each column.

Step 1103a and Step 1103b may be performed in parallel.

Step 1104: A surplus amount of each line of the authorization matrix is scanned line by line.

Step 1105: Whether an acquired line surplus amount is larger than 0 is judged, and if yes, Step 1106 is performed. Otherwise, Step 1104 is performed.

Step 1106: A surplus amount of each column corresponding to each connection of a current line is scanned column by column.

Step 1107: Whether each column at the current line has been scanned is judged. If yes, Step 1104 is performed, and otherwise, Step 1108 is performed.

Step 1108: Whether a column surplus amount is larger than 0 is judged. If yes, Step 1109 is performed, and otherwise, Step 1106 is performed.

Step 1109: An authorized bandwidth is increased for a connection corresponding to the intersection of a line and a column both having surplus bandwidths, and an increased amount is the minimum value of a line surplus amount and a column surplus amount.

Preferably, the bandwidth authorization matrix acquired primarily through the authorization synthesizing process necessarily satisfies both the limitation on the transmission capability of the source nodes and the limitation on the receiving capability of the destination nodes. However, since the same connection only applies the maximum authorization value of the line authorization matrix and the column authorization matrix, thus there may be surplus bandwidths in lines and columns of the bandwidth authorization matrix. Connections of the bandwidth authorization matrix may be scanned line by line and column by column so as to fully utilize bandwidth resources. If a line and a column where a certain connection locates have surplus bandwidths, authorized bandwidths may be supplemented for the connection, wherein the maximum supplementation amount may be the minimum surplus amount between the line where the connection locates and the column where the connection locates. Particularly, a surplus amount of a line where a certain connection locates is a surplus amount of an upper triangular part or a lower triangular part where the connection locates.

Preferably, when the authorization reducing module 701 is provided with the authorization synthesizing unit 7013, the line reduction and the column reduction are not performed according to a sequence, and action objects of the two are current bandwidth request matrixes.

Preferably, the authorization synthesizing unit 7013 of the authorization reducing module 701 may be omitted without evidently reducing the total amount of authorized bandwidths. It needs to be pointed out that it is required that when the authorization synthesizing unit is omitted, an object of line reduction is a bandwidth request matrix having been subjected to column reduction, or equally, an object of column reduction is a bandwidth request matrix having been subjected to line reduction, so as to strictly guarantee the limitation on the transmission capability of the source nodes and the limitation on the receiving capability of the destination nodes.

Figure 12:
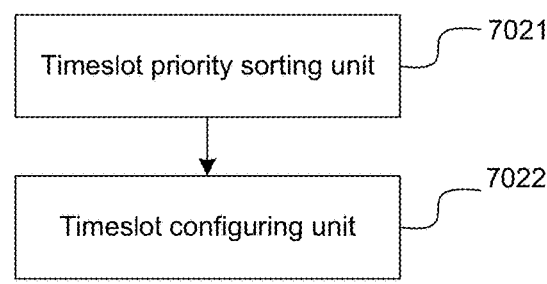
FIG. 12 is a schematic diagram of a timeslot configuring module according to an embodiment of the present disclosure.

FIG. 12 is a schematic diagram of a timeslot configuring module 702, including a timeslot priority sorting unit 7021 and a timeslot configuring unit 7022.

The timeslot priority sorting unit 7021 is configured to determine the timeslot selection priority for transmission from each source node to different destination nodes. Particularly, if timeslots of destination nodes under each source node are configured among timeslots in which an OB which has not yet been transmitted exists, a timeslot occupied by a node which has the smallest hop count to a currently configured destination node and serves as a destination node is selected preferentially, thereby avoiding occupation of candidate timeslots of other to-be-configured destination nodes to the best extent.

Preferably, there may be different combinations of OBs that have not yet been transmitted on each timeslot when a data frame arrives at each source node while these combinations of OBs that have not yet been transmitted directly affect the timeslot selection priority for transmission from the source node to different destination nodes. Specifically, taking FIG. 13 as an example, when transmission timeslots of source node A are configured, and distribution of OBs, that have not yet been transmitted, of a data frame is as shown in FIG. 13a, a timeslot in which an OB which has the smallest hop count to node B and has not yet been transmitted exists is selected preferentially for timeslot configuration for transmission from source node A to destination node B, as required by a sequential timeslot configuration method. In other words, a timeslot having an OB which is sent to destination node C and has not yet been transmitted is selected preferentially, such as timeslots {1,2,6} in the example as shown in the figure. Secondly, a timeslot in which an OB, which has the second smallest hop count to destination node B configured currently, is sent to the destination node D and has not yet been transmitted exists is selected preferentially, such as timeslot {7} in the example as shown in the figure. Particularly, when the timeslot priority is sorted, different priority may be set according to hop counts, and a timeslot in which an OB which has the smallest hop count to a configured destination node and has not yet been transmitted exists has the highest selection priority. During the timeslot selection for the transmission from source node A to destination node B, timeslots {1,2,6} have the highest selection priority; and timeslot {7} has the second highest selection priority.

Preferably, if a timeslot has more than two OBs that have not yet been transmitted and have different hop counts to a destination node configured currently, then the timeslot should have priority corresponding to an OB that has the smallest hop count to a destination node configured currently and has not yet been transmitted. However, selection of the timeslot is postponed in the priority. For example, in timeslot configuration for the transmission from source node A to destination node B in FIG. 13a, timeslots {1,2,6} have the highest selection priority and timeslot {7} has the second highest selection priority. However, besides an OB which has the smallest hop count to node B and has not yet been transmitted, timeslot 6 also has an OB which is sent to destination D and has not yet been transmitted, thus selection of timeslot 6 is postponed in the first highest selection priority.

Preferably, if a timeslot has an OB that is sent to a destination node configured currently and has not yet been transmitted, the timeslot is unavailable for the destination node configured currently.

Preferably, FIG. 13b shows graphical representation of the timeslot selection priority: each line represents that a current source node may perform transmission to different destination nodes, and each column represents a timeslot number in the data frame. Particularly, the values filled in elements of each line represent the timeslot selection priority of corresponding destination nodes. In the present embodiment, a smaller value of an element represents higher priority. In FIG. 13b, "−1" represents that a timeslot is unavailable, "kM+x" represents that the priority to select the timeslot is the $x^{th}$ selection at the $k^{th}$ level.

The timeslot configuring unit 7022 is configured to, for each source node of the bandwidth authorization matrix, acquire the timeslot selection priority for transmission from a current source node to different destination nodes after the timeslot selection priority is sorted, and then configure transmission timeslots for services from the current source node to different destination nodes according to the selection priority.

Preferably, a timeslot having the highest selection priority is selected preferentially for timeslot configuration of each destination node under the current source node.

Preferably, if a candidate timeslot has been used by other destination nodes of the current source node, a timeslot having a second highest selection priority is selected preferentially for the current destination node. Particularly, if a current to-be-configured node has traversed all candidate timeslots from high priority to low priority and learns that all the candidate timeslots are used by other destination nodes, authorization of the to-be-configured node is set as 0.

Particularly, if timeslots of all destination nodes under the current source node are configured according to the timeslot selection priority, then transmission timeslots of the next source not are configured. After transmission timeslots of all source nodes are configured, a process of updating a bandwidth map is finished, and a new bandwidth map is acquired.

An embodiment of the present disclosure also records a dynamic bandwidth scheduling method, applied to a node in an OBTN, as shown in FIG. 14, including the following steps:

Step 1401: when a target node serves as a master node, for each source node in the OBTN, when the target node allocates a timeslot for a connection from the source node to a destination node, the target node preferentially selects, among timeslots in which an OB which has not yet been transmitted exists, a timeslot occupied by a destination node having the smallest hop count to a destination node configured currently.

Step 1402: when the target node serves as a master node, a timeslot allocation result is converted into a bandwidth map and the bandwidth map is sent to each slave node in the OBTN.

Preferably, when the target node serves as a master node, a bandwidth is authorized for a connection from each source node to a destination node according to bandwidth requests of nodes of the whole network.

Preferably, the step that a bandwidth is authorized for a connection from each source node to a destination node according to the bandwidth requests of the nodes of the whole network includes that:

the master node acquires a bandwidth request matrix according to the bandwidth requests of the nodes of the whole network, wherein element $A_{ij}$ in the bandwidth request matrix represents a bandwidth request of node i to node j in the OBTN, i and j are positive integers smaller than or equal to N, and N is the total number of the nodes in the OBTN;

the master node reduces authorization for the bandwidth request matrix according to existing bandwidth resources, so as to acquire a bandwidth authorization matrix, wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, the sum of authorized bandwidths of elements of each line is smaller than or equal to a maximum line rate; for each column in the bandwidth authorization matrix, the sum of authorized bandwidths of all elements in an upper triangular part of the column, and the sum of authorized bandwidths of all elements in a lower triangular part of the same column in a bandwidth authorization matrix received a period of a ring length ago are smaller than or equal to the maximum line rate.

Preferably, the step that the master node reduces the authorization for the bandwidth request matrix according to the existing bandwidth resources includes that:

the master node reduces the bandwidth request matrix by lines, and reduces a matrix acquired after the line reduction by columns.

Preferably, the step that the master node reduces the bandwidth request matrix by lines includes that: for each line in the bandwidth request matrix, whether the sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate; and the step that the master node reduces the matrix acquired after the line reduction by columns includes that: for each column in the matrix acquired after the line reduction, whether the sum of elements in a lower triangular part of the column exceeds the difference between the maximum line rate and a preset amount of reserved bandwidths of the column is judged on one hand, and if the sum of elements in a lower triangular part of the column exceeds the difference between the maximum line rate and a preset amount of reserved bandwidths of the column, bandwidths are reallocated for the elements in the lower triangular part of the column until an acquired sum of the elements in the lower triangular part of the column is smaller than or equal to the difference between the maximum line rate and the preset amount of reserved bandwidths of the column; and whether the sum of elements in an upper triangular part of the column exceeds a maximum amount of authorized bandwidths of the upper triangular part of the column is judged on the other hand, and if the sum of elements in an upper triangular part of the column exceeds a maximum amount of authorized bandwidths of the upper triangular part of the column, bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago.

Preferably, a step that the master node reduces the bandwidth request matrix by columns includes that: for each column in the bandwidth request matrix, whether the sum of elements in a lower triangular part of the column exceeds the difference between the maximum line rate and a preset amount of reserved bandwidths of the column is judged on one hand, and if the sum of elements in a lower triangular part of the column exceeds the difference between the maximum line rate and a preset amount of reserved bandwidths of the column, bandwidths are reallocated for the elements in the column until an acquired sum of the elements in the lower triangular part of the column is smaller than or equal to the difference between the maximum line rate and the preset amount of reserved bandwidths of the column; and whether the sum of elements in an upper triangular part of the column exceeds a maximum amount of authorized bandwidths of the upper triangular part of the column is judged on the other hand, and if the sum of elements in an upper triangular part of the column exceeds a maximum amount of authorized bandwidths of the upper triangular part of the column, then bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago; and a step that the master node reduces a matrix acquired after the column reduction by lines includes that: for each line in the matrix acquired after the column reduction, whether the sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate.

Preferably, the step that the master node reduces the bandwidth request matrix by lines includes that: for each line in the bandwidth request matrix, whether the sum of elements in the line exceeds the maximum line rate is judged, and if the sum of elements in the line exceeds the maximum line rate, bandwidths are reallocated for the elements in the line until an acquired sum of the elements in the line is smaller than or equal to the maximum line rate;

the step that the master node reduces the bandwidth request matrix by columns includes that:

for each column in the bandwidth request matrix, whether the sum of elements in a lower triangular part of the column exceeds the difference between the maximum line rate and a preset amount of reserved bandwidths of the column is judged on one hand, and if the sum of elements in a lower triangular part of the column exceeds the difference between the maximum line rate and the preset amount of reserved bandwidths of the column, bandwidths are reallocated for the elements in the lower triangular part of the column until an acquired sum of the elements in the lower triangular part of the column is smaller than or equal to the difference between the maximum line rate and the preset amount of reserved bandwidths; and whether the sum of elements in an upper triangular part of the column exceeds a maximum amount of authorized bandwidths of the upper triangular part of the column is judged on the other hand, and if the sum of elements in an upper triangular part of the column exceeds a maximum amount of authorized bandwidths of the upper triangular part of the column, bandwidths are reallocated for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago; and when the bandwidth authorization matrix is determined, a smaller one of values of an element at a same location in a matrix acquired after the line reduction and a matrix acquired after the column reduction is taken as a value of an element at a corresponding location in the bandwidth authorization matrix.

Preferably, the method further includes that:

after determining the value of each element in the bandwidth authorization matrix, the master node scans the bandwidth authorization matrix line by line and column by column, increases the value of an element at the intersection of a line in which the sum of elements in the line is smaller than the maximum line rate and a column in which the sum of elements in an upper triangular part in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column; the master node increases the value of an element at the intersection of a line and a column, wherein the line is a line in which the sum of elements included is smaller than the maximum line rate, and the column satisfies that the sum of elements in a lower triangular part in the bandwidth authorization matrix is smaller than the difference between the maximum line rate and a preset amount of reserved bandwidths of the column, and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

Preferably, the step that bandwidths are reallocated for the elements in the column includes that:

bandwidths are allocated for the elements in the column accordingly by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority; and the step that bandwidths are reallocated for the elements in the line includes that:

bandwidths are allocated for the elements in the line accordingly by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority.

Preferably, the method further includes that:

after bandwidths are allocated for the elements in the column or in the line by using the non-assured bandwidth allocation manner, if there are still remaining bandwidths in the column or in the line, the remaining bandwidths are allocated to an unsaturated connection in the column or in the line in a polling manner accordingly, and 1 OB is allocated during each polling, wherein the unsaturated connection is a connection having a smaller amount of existing authorized bandwidths than an amount of actual requested bandwidths.

Preferably, wherein the method further includes that:

when timeslots are allocated, the master node configures, according to a sorting sequence of nodes in an OBTN ring, the timeslots in order by respectively taking the nodes as source nodes starting from the master node;

a configuration sequence of destination nodes under each source node is that: according to the sorting sequence of the nodes in the OBTN ring, the timeslots are configured in turn from a destination node having a small hop count to the source node to a destination node having a large hop count to the source node.

Preferably, the method further includes that:

when a timeslot is allocated for a connection from the source node to a certain destination node, if there are more than two timeslots occupied by a destination node having the smallest hop count to a destination node configured currently, a timeslot having the smallest timeslot number is selected preferentially among timeslots in which an OB which has not yet been transmitted exists.

Preferably, the method further includes that:

when the target node serves as a slave node, the target node synthesizes a bandwidth map received currently and a cross ring bandwidth map to acquire a received map, and receives a corresponding data frame according to the received map, wherein the cross ring bandwidth map is a bandwidth map received by the target node a period of a ring length ago, and in the received map, element $R_{nm}=j$ represents that target node n at timeslot m receives an OB sent by source node j; in a prime number bandwidth map, element $A_{nm}=i$ represents that source node n sends an OB to target node i at timeslot m, and m, n, i and j are positive integers, wherein the step that the bandwidth map received currently and the cross ring bandwidth map are synthesized to acquire the received map includes that:

the cross ring bandwidth map is scanned line by line or column by column, and for each element in the cross ring bandwidth map, if the value of the element is smaller than a line number of a line where the element locates, the line number of the line where the element locates is used as the value of an element which takes the value of the element and a column number of the element in the received bandwidth map respectively as a line number and a column number; and the bandwidth map received currently is scanned line by line or column by column, and for each element in the bandwidth map, if the value of the element is larger than a line number of a line where the element locates, the line number of the line where the element locates is used as the value of an element which takes the value of the element and a column number of the element in the received bandwidth map respectively as a line number and a column number.

Preferably, the method further includes that:

when a control frame and a corresponding data frame arrives at a node in the OBTN simultaneously, the node delays the received data frame through an FDL, wherein the delay time is longer than or equal to the time for the node to process the control frame.

Figure 15A:
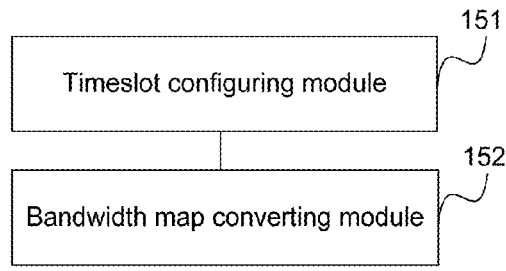
FIG. 15a to FIG. 15d are structural diagrams of a dynamic bandwidth scheduling device in the embodiments of the present disclosure.

An embodiment of the present disclosure also recites a dynamic bandwidth scheduling device, applied on a master node in an OBTN, as shown in FIG. 15a, and including:

a timeslot configuring module 151 configured to, for each source node in the OBTN, when allocating a timeslot for a connection from the source node to a destination node, preferentially select, among timeslots in which an OB which has not yet been transmitted exists, a timeslot occupied by a destination node having the smallest hop count to a destination node configured currently, and a bandwidth map converting module 152 configured to convert a timeslot allocation result acquired by the timeslot configuring module 151 into a bandwidth map and send the bandwidth map to each slave node in the OBTN.

Figure 15B:
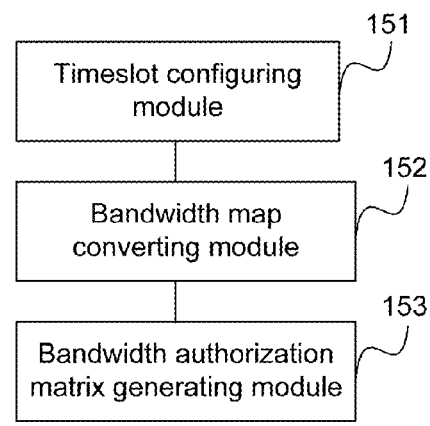

As an implementation mode, as shown in FIG. 15b, the device may further include a bandwidth authorization matrix generating module 153, configured to acquire a bandwidth request matrix according to bandwidth requests of nodes of the whole network, wherein element $A_{ij}$ in the bandwidth request matrix represents a bandwidth request of node i to node j in the OBTN, i and j are positive integers smaller than or equal to N, and N is the total number of the nodes in the OBTN; and an authorization reducing module 154, configured to reduce authorization for the bandwidth request matrix according to existing bandwidth resources, so as to acquire a bandwidth authorization matrix, wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, the sum of authorized bandwidths of elements of each line is smaller than or equal to a maximum line rate; for each column in the bandwidth authorization matrix, the sum of authorized bandwidths of all elements in an upper triangular part of the column, and the sum of authorized bandwidths of all elements in a lower triangular part of the same column in a bandwidth authorization matrix received a period of a ring length ago are smaller than or equal to the maximum line rate.

Figure 15C:
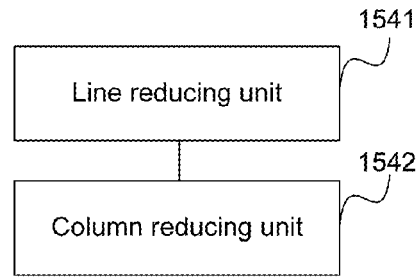

As an implementation mode, as shown in FIG. 15c, the authorization reducing module 154 may include:

a line reducing unit 1541, configured to reduce the bandwidth request matrix by lines; and a column reducing unit 1542, configured to reduce a matrix acquired after the line reduction by columns.

As an implementation mode, the line reducing unit 1541 may include (not shown in a figure): a first judging sub-unit configured to, for each line in the bandwidth request matrix, judge whether the sum of elements in the line exceeds the maximum line rate; and a first allocating sub-unit coupled with the first judging sub-unit and configured to, when a judging result of the first judging sub-unit is the sum of elements in the line exceeds the maximum line rate, reallocate bandwidths for the elements in the line until an acquired sum of the elements in the line is smaller than or equal to the maximum line rate; and the column reducing unit 1542 may include: a second judging sub-unit configured to, for each column in the matrix acquired after the line reduction, judge whether the sum of elements in a lower triangular part of the column exceeds the difference between the maximum line rate and a preset amount of reserved bandwidths of the column, and a second allocating sub-unit coupled with the second judging sub-unit and configured to, when a judging result of the second judging sub-unit is the sum of elements in the lower triangular part of the column exceeds the difference between the maximum line rate and the preset amount of reserved bandwidths of the column, reallocate bandwidths for the elements in the lower triangular part of the column until an acquired sum of the elements in the lower triangular part of the column is smaller than or equal to the difference between the maximum line rate and the preset amount of reserved bandwidths of the column; and a third judging sub-unit configured to, for each column in the matrix acquired after the line reduction, judge whether the sum of elements in an upper triangular part of the column exceeds a maximum amount of authorized bandwidths of the upper triangular part of the column; and a third allocating sub-unit coupled with the third judging sub-unit and configured to, when a judging result of the third judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago.

Preferably, the line reducing unit 1541 includes: a fourth judging sub-unit configured to, for each line in a matrix acquired after the column reduction, judge whether the sum of elements in the line exceeds the maximum line rate, and a fourth allocating sub-unit coupled with the fourth judging sub-unit and configured to, when a judging result of the fourth judging sub-unit is the sum of elements in the line exceeds the maximum line rate, reallocate bandwidths for the elements in the line until an acquired sum of the elements in the line is smaller than or equal to the maximum line rate, wherein the column reducing unit 1542 includes: a fifth judging sub-unit configured to, for each column in the bandwidth request matrix, judge whether the sum of elements in a lower triangular part of the column exceeds the difference between the maximum line rate and a preset amount of reserved bandwidths of the column, and a fifth allocating sub-unit coupled with the fifth judging sub-unit and configured to, when a judging result of the fifth judging sub-unit is the sum of elements in the lower triangular part of the column exceeds the difference between the maximum line rate and the preset amount of reserved bandwidths of the column, reallocate bandwidths for the elements in the column until an acquired sum of the elements in the lower triangular part of the column is smaller than or equal to the difference between the maximum line rate and the preset amount of reserved bandwidths of the column;

a sixth judging sub-unit configured to, for each column in the bandwidth request matrix, judge whether the sum of elements in an upper triangular part of the column exceeds a maximum amount of authorized bandwidths of the upper triangular part of the column, and a sixth allocating sub-unit coupled with the sixth judging sub-unit and configured to, when a judging result of the sixth judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago.

Figure 15D:
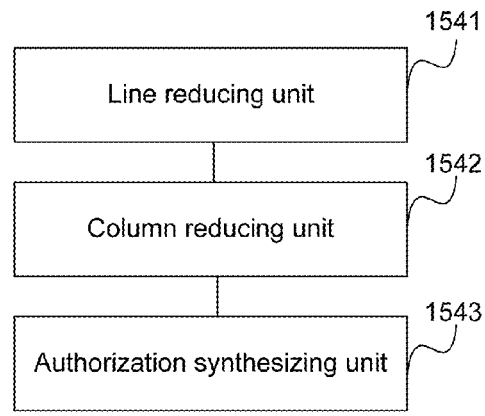

As an implementation mode, based on FIG. 15c and as shown in FIG. 15d, the authorization reducing module 154 may further include:

an authorization synthesizing unit 1543 configured to, when the bandwidth authorization matrix is determined, take a smaller one of values of an element at a same location in a matrix acquired after the line reduction and a matrix acquired after the column reduction as a value of an element at a corresponding location in the bandwidth authorization matrix;

accordingly, the line reducing unit 1541 may include: a seventh judging sub-unit configured to, for each line in the bandwidth request matrix, judge whether the sum of elements in the line exceeds the maximum line rate, and a seventh allocating sub-unit coupled with the seventh judging sub-unit and configured to, when a judging result of the seventh judging sub-unit is the sum of elements in the line exceeds the maximum line rate, reallocate bandwidths for the elements in the line until an acquired sum of the elements in the line is smaller than or equal to the maximum line rate;

the column reducing unit 1542 may include: an eighth judging sub-unit configured to, for each column in the bandwidth request matrix, judge whether the sum of elements in a lower triangular part of the column exceeds the difference between the maximum line rate and a preset amount of reserved bandwidths of the column, and an eighth allocating sub-unit coupled with the eighth judging sub-unit and configured to, when a judging result of the eighth judging sub-unit is the sum of elements in the lower triangular part of the column exceeds the difference between the maximum line rate and the preset amount of reserved bandwidths of the column, reallocate bandwidths for the elements in the lower triangular part of the column until an acquired sum of the elements in the lower triangular part of the column is smaller than or equal to the difference between the maximum line rate and the preset amount of reserved bandwidths;

a ninth judging sub-unit configured to judge, for each column in the bandwidth request matrix, whether the sum of elements in an upper triangular part of the column exceeds a maximum amount of authorized bandwidths of the upper triangular part of the column, and a ninth allocating sub-unit coupled with the ninth judging sub-unit and configured to, when a judging result of the ninth judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is the difference between the maximum line rate and an actual amount of authorized bandwidths of a lower triangular part of the same column in a bandwidth authorization matrix received a period of a ring length ago.

Here, the first allocating sub-unit to the ninth allocating sub-unit are further configured to apply the following method to reallocate bandwidths for elements in a line:

bandwidths are allocated for the elements in the line accordingly by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority;

and is further configured to apply the following method to configure bandwidths for elements in a column:

bandwidths are allocated for the elements in the column accordingly by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority.

The first allocating sub-unit to the ninth allocating sub-unit are further configured to, after bandwidths are allocated for elements in a certain column by using the non-assured bandwidth allocation manner, if there are still remaining bandwidths in the column, allocate the remaining bandwidths to an unsaturated connection in the column in a polling manner and allocate 1 OB during each polling, wherein the unsaturated connection is a connection having a smaller amount of existing authorized bandwidths than an amount of actual requested bandwidths; and after bandwidths are allocated for elements in a certain line by using the non-assured bandwidth allocation manner, if there are still remaining bandwidths in the line, allocate the remaining bandwidths to an unsaturated connection in the line in a polling manner and allocate 1 OB during each polling, wherein the unsaturated connection is a connection having a smaller amount of existing authorized bandwidths than an amount of actual requested bandwidths.

As an implementation mode, the authorization synthesizing unit 1543 includes:

a scanning sub-unit configured to, after determining the value of each element in the bandwidth authorization matrix, scan the bandwidth authorization matrix line by line and column by column;

a first increasing sub-unit, coupled with the scanning sub-unit and configured to increase the value of an element at the intersection of a line in which the sum of elements in the line is smaller than the maximum line rate and a column in which the sum of elements in an upper triangular part in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column;

a second increasing sub-unit, coupled with the eleventh scanning sub-unit and configured to increase the value of an element at the intersection of a line in which the sum of elements in the line is smaller than the maximum line rate, and a column in which the sum of elements in a lower triangular part in the column is smaller than the difference between the maximum line rate and a preset amount of reserved bandwidths of the column; and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

As an implementation mode, the timeslot configuring module 151 is further configured to, when configuring timeslots, configure according to a sorting sequence of nodes in an OBTN ring, the timeslots in order by respectively taking the nodes as source nodes starting from the master node; and is further configured to determine a configuration sequence of destination nodes under each source node as follows: according to the sorting sequence of the nodes in the OBTN ring, the timeslots are configured in turn from a destination node having a small hop count to the source node to a destination node having a large hop count to the source node.

As an implementation mode, the timeslot configuring module 151 is further configured to, when a timeslot is allocated for a connection from the source node to a certain destination node, preferentially select, among timeslots in which an OB which has not yet been transmitted exists, a timeslot having the smallest timeslot number if there are more than two timeslots occupied by a destination node having the smallest hop count to a destination node configured currently.

During practical application, the modules and units recited by the embodiments of the present disclosure may be implemented by Central Processing Units (CPU), Digital Signal Processors (DSP) or Field Programmable Gate Arrays (FPGA) in dynamic bandwidth scheduling.

An embodiment of the present disclosure further recites a computer storage medium. The computer storage medium stores a computer executable instruction and the computer executable instruction is used for executing the dynamic bandwidth scheduling method.

Those of ordinary skill in the art may understand that, all or part of the steps for implementing the embodiments of the method may be implemented by using related hardware instructed by a program. The program may be stored in a computer readable storage medium. When executed, the program executes steps of the embodiments of the method and the storage medium includes various types of medium that can store program codes, including: a mobile storage device, a Random Access Memory (RAM), a Read-Only Memory (ROM), a magnetic disk, an optical disk and so on. Or when implemented in a form of a software functional module and sold or used as an independent product, the integrated units of the present disclosure may be also stored in a computer-readable storage medium. Based on such understanding, the essential part or a part contributing to related art of the technical solutions of the embodiments of the present disclosure may be embodied in a form of a software product which is stored in a storage medium and includes several instructions for allowing a computer device (which may be a personal computer, a server, a network device, or the like) to execute all or a part of the method in the embodiments of the present disclosure. The storage medium include various types of medium that can store program codes, including a mobile storage device, an RAM, an ROM, a magnetic disk, an optical disk and so on.

The foregoing description is merely about specific embodiments of the present disclosure, but is not intended to limit the protection scope of the present disclosure. Any variation or replacement easily thought of by any persons skilled in the art within the technical scope disclosed in the present disclosure shall be covered within the protection scope of the present disclosure. Therefore, the protection scope of the present disclosure shall be subject to the protection scope of the appended claims.

What is claimed is:

1. A dynamic bandwidth scheduling method, applied to a node in an Optical Burst Transport ring-Network (OBTN), the method comprising:
when a target node serves as a master node, for each source node in the OBTN, when the target node allocates a timeslot for a connection from the source node to a destination node, preferentially selecting, by the target node, among timeslots in which there exists an Optical Burst (OB) where there has been no drop operation, a timeslot occupied by a destination node having a smallest hop count to a destination node configured currently; and when the target node serves as a master node, converting a timeslot allocation result into a bandwidth map and sending the bandwidth map to each slave node in the OBTN,
the method further comprising:
when timeslots are allocated, configuring, by the master node according to a sorting sequence of nodes in an OBTN ring, the timeslots in order by respectively taking the nodes as source nodes starting from the master node;
wherein a configuration sequence of destination nodes under each source node is that: according to the sorting sequence of the nodes in the OBTN ring, the timeslots are configured in turn from a destination node having a small hop count to the source node to a destination node having a large hop count to the source node;
when a timeslot is allocated for a connection from the source node to a certain destination node, preferentially selecting, among timeslots in which there exists an OB where there has been no drop operation, a timeslot having a smallest timeslot number if there are more than two timeslots occupied by the destination node having a smallest hop count to the destination node configured currently.

2. The method according to claim 1, further comprising:
when the target node serves as a master node, authorizing a bandwidth for a connection from each source node to a destination node according to bandwidth requests of nodes of a whole network.

3. The method according to claim 2, wherein the step of authorizing a bandwidth for a connection from each source node to a destination node according to bandwidth requests of nodes of the whole network comprises:
acquiring, by the master node, a bandwidth request matrix according to the bandwidth requests of the nodes of the whole network, wherein element $A_{ij}$ in the bandwidth request matrix represents a bandwidth request of node i to node j in the OBTN, i and j are positive integers smaller than or equal to N, and N is a total number of nodes in the OBTN;
reducing, by the master node, authorization for the bandwidth request matrix according to existing bandwidth resources, so as to acquire a bandwidth authorization matrix; wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, a sum of authorized bandwidths of elements of each line is smaller than or equal to a maximum line rate; for each column in the bandwidth authorization matrix, a sum of authorized bandwidths of all elements in an upper triangular part of the column, and a sum of authorized bandwidths of all elements in a lower triangular part of the same column in a bandwidth authorization matrix received a period of a ring length ago are smaller than or equal to the maximum line rate.

4. The method according to claim 3, wherein the reducing, by the master node, authorization for the bandwidth request matrix according to existing bandwidth resources comprises:
reducing, by the master node, the bandwidth request matrix by lines; and
reducing, by the master node, a matrix acquired after the line reduction by columns.

5. The method according to claim 4, wherein the reducing, by the master node, the bandwidth request matrix by lines comprises: for each line in the bandwidth request matrix, judging whether a sum of elements in the line exceeds the maximum line rate, and if the sum of elements in the line exceeds the maximum line rate, then reallocating bandwidths for the elements in the line until an acquired sum of the elements in the line is smaller than or equal to the maximum line rate; and the reducing, by the master node, a matrix acquired after the line reduction by columns, comprises: for each column in the matrix acquired after the line reduction, judging, on one hand, whether a sum of elements in a lower triangular part of the column exceeds a difference between the maximum line rate and a preset amount of reserved bandwidths of the column, and if the sum of elements in the lower triangular part of the column exceeds the difference between the maximum line rate and the preset amount of reserved bandwidths of the column, then reallocating bandwidths for the elements in the lower triangular part of the column until an acquired sum of the elements in the lower triangular part of the column is smaller than or equal to the difference between the maximum line rate and the preset amount of reserved bandwidths of the column; and judging, on the other hand, whether a sum of elements in an upper triangular part of the column exceeds a maximum amount of authorized bandwidths of the upper triangular part of the column, and if the sum of elements in the upper triangular part of the column exceeds the maximum amount of authorized bandwidths of the upper triangular part of the column, then reallocating bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

6. The method according to claim 4, wherein reducing, by the master node, the bandwidth request matrix by columns comprises: for each column in the bandwidth request matrix, judging, on one hand, whether a sum of elements in a lower triangular part of the column exceeds a difference between the maximum line rate and a preset amount of reserved bandwidths of the column, and if the sum of elements in the lower triangular part of the column exceeds the difference between the maximum line rate and the preset amount of reserved bandwidths of the column, then reallocating bandwidths for the elements in the column until an acquired sum of the elements in the lower triangular part of the column is smaller than or equal to the difference between the maximum line rate and the preset amount of reserved bandwidths of the column; and judging, on the other hand, whether a sum of elements in an upper triangular part of the column exceeds a maximum amount of authorized bandwidths of the upper triangular part of the column, and if the sum of elements in the upper triangular part of the column exceeds the maximum amount of authorized bandwidths of the upper triangular part of the column, then reallocating bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago; and reducing, by the master node, a matrix acquired after the column reduction by lines comprises: for each line in the matrix acquired after the column reduction, judging whether a sum of elements in the line exceeds the maximum line rate, and if the sum of elements in the line exceeds the maximum line rate, then reallocating bandwidths for the elements in the line until an acquired sum of the elements in the line is smaller than or equal to the maximum line rate.

7. The method according to claim 4, wherein the reducing, by the master node, the bandwidth request matrix by lines comprises: for each line in the bandwidth request matrix, judging whether a sum of elements in the line exceeds the maximum line rate, and if the sum of elements in the line exceeds the maximum line rate, then reallocating bandwidths for the elements in the line until an acquired sum of the elements in the line is smaller than or equal to the maximum line rate;

reducing, by the master node, the bandwidth request matrix by columns comprises:

for each column in the bandwidth request matrix, judging, on one hand, whether a sum of elements in a lower triangular part of the column exceeds a difference between the maximum line rate and a preset amount of reserved bandwidths of the column, and if the sum of elements in the lower triangular part of the column exceeds the difference between the maximum line rate and the preset amount of reserved bandwidths of the column, reallocating bandwidths for the elements in the lower triangular part of the column until an acquired sum of the elements in the lower triangular part of the column is smaller than or equal to the difference between the maximum line rate and the preset amount of reserved bandwidths; and judging, on the other hand, whether a sum of elements in an upper triangular part of the column exceeds a maximum amount of authorized bandwidths of the upper triangular part of the column, and if the sum of elements in the upper triangular part of the column exceeds the maximum amount of authorized bandwidths of the upper triangular part of the column, reallocating bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago; and when the bandwidth authorization matrix is determined, taking a smaller one of values of an element at a same location in a matrix acquired after the line reduction and a matrix acquired after the column reduction as a value of an element at a corresponding location in the bandwidth authorization matrix.

8. The method according to claim 7, further comprising:
after determining a value of each element in the bandwidth authorization matrix, scanning, by the master node, the bandwidth authorization matrix line by line and column by column, increasing a value of an element at an intersection of a line in which a sum of elements in the line is smaller than the maximum line rate and a column in which a sum of elements in an upper triangular part in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column; increasing a value of an element at an intersection of a line and a column, wherein the line is a line in which a sum of elements included is smaller than the maximum line rate, and the column satisfies that a sum of elements in a lower triangular part in the bandwidth authorization matrix is smaller than a difference between the maximum line rate and a preset amount of reserved bandwidths of the column, and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

9. The method according to claim 5, wherein
the reallocating bandwidths for elements in the column comprises:
allocating bandwidths for the elements in the column by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority;
the reallocating bandwidths for the elements in the line comprises:
allocating bandwidths for the elements in the line by using a currently available bandwidth allocation manner having highest priority according to a sequence that a fixed bandwidth allocation manner has highest allocation priority, an assured bandwidth allocation manner has second highest priority, and a non-assured bandwidth allocation manner has lowest priority;
the method further comprises:
after bandwidths are allocated for the elements in the column or in the line by using the non-assured bandwidth allocation manner, if there are still remaining bandwidths in the column or in the line, then allocating the remaining bandwidths to an unsaturated connection in the column or in the line in a polling manner accordingly, and allocating 1 OB during each polling, wherein the unsaturated connection is a connection having a smaller amount of existing authorized bandwidths than an amount of actual requested bandwidths.

10. The method according to claim 1, further comprising:
when the target node serves as a slave node, synthesizing, by the target node, a bandwidth map received currently and a cross ring bandwidth map to acquire a received map, and receiving a corresponding data frame according to the received map, wherein the cross ring bandwidth map is a bandwidth map received by the target node a period of a ring length ago; and in the received map, element $R_{nm}=j$ represents that target node n at timeslot m receives an OB sent by source node j; in a prime number bandwidth map, element $A_{nm}=i$ represents that source node n sends an OB to target node i at timeslot m, and m, n, i and j are positive integers, wherein
the synthesizing a bandwidth map received currently and a cross ring bandwidth map to acquire a received map comprises:
scanning the cross ring bandwidth map line by line or column by column, and for each element in the cross ring bandwidth map, if a value of the element is smaller than a line number of a line where the element locates, then taking the line number of the element as a value of an element which takes the value of the element and a column number of the element in the received bandwidth map respectively as a line number and a column number; and
scanning the bandwidth map received currently line by line or column by column, and for each element in the bandwidth map, if a value of the element is larger than a line number of a line where the element locates, then taking the line number of the element a value of an element which takes the value of the element and a column number of the element in the received bandwidth map respectively as a line number and a column number.

11. The method according to claim 1, further comprising:
when a control frame and a corresponding data frame arrives at a node in the OBTN simultaneously, delaying, by the node, the received data frame through a Fiber Delay Line (FDL), wherein delay time is longer than or equal to time for the node to process the control frame.

12. A dynamic bandwidth scheduling device of an Optical Burst Transport ring-Network (OBTN), applied on a master node in the OBTN, the device comprising:
a timeslot configuring module configured to, for each source node in the OBTN, when allocating a timeslot for a connection from the source node to a destination node, preferentially select, among timeslots in which there exists an Optical Burst (OB) where there has been no drop operation, a timeslot occupied by a destination node having a smallest hop count to a destination node configured currently, and
a bandwidth map converting module configured to convert a timeslot allocation result acquired by the timeslot configuring module into a bandwidth map and send the bandwidth map to each slave node in the OBTN,
wherein the timeslot configuring module is further configured to, when timeslots are allocated, configure according to a sorting sequence of nodes in an OBTN ring, the timeslots in order by respectively taking the nodes as source nodes starting from the master node; and is further configured to determine a configuration sequence of destination nodes under each source node as follows: according to the sorting sequence of the nodes in the OBTN ring, the timeslots are configured in turn from a destination node having a small hop count to the source node to a destination node having a large hop count to the source node;
wherein the timeslot configuring module is further configured to, when a timeslot is allocated for a connection from the source node to a certain destination node, preferentially select, among timeslots in which there exists an OB where there has been no drop operation, a timeslot having a smallest timeslot number if there are more than two timeslots occupied by the destination node having a smallest hop count to the destination node configured currently.

13. The device according to claim 12, further comprising:
a bandwidth authorization matrix generating module configured to acquire a bandwidth request matrix according to bandwidth requests of nodes of a whole network, wherein element $A_{ij}$ in the bandwidth request matrix represents a bandwidth request of node i to node j in the OBTN, i and j are positive integers smaller than or equal to N, and N is a total number of nodes in the OBTN; and
an authorization reducing module, configured to reduce authorization for the bandwidth request matrix according to existing bandwidth resources, so as to acquire a bandwidth authorization matrix, wherein element $B_{ij}$ in the bandwidth authorization matrix represents an authorized bandwidth which is authorized by node i for node j in the OBTN, i and j are positive integers smaller than or equal to N, and N is the total number of the nodes in the OBTN; in the bandwidth authorization matrix, a sum of authorized bandwidths of elements of each line is smaller than or equal to a maximum line rate; for each column in the bandwidth authorization matrix, a sum of authorized bandwidths of all elements in an upper triangular part of the column, and a sum of authorized bandwidths of all elements in a lower triangular part of the same column in a bandwidth authorization matrix received a period of a ring length ago are smaller than or equal to the maximum line rate.

14. The device according to claim 13, wherein the authorization reducing module comprises:
a line reducing unit, configured to reduce the bandwidth request matrix by lines; and
a column reducing unit, configured to reduce a matrix acquired after the line reduction by columns.

15. The device according to claim 14, wherein
the line reducing unit comprises: a first judging sub-unit configured to, for each line in the bandwidth request matrix, judge whether a sum of elements in the line exceeds the maximum line rate; and a first allocating sub-unit configured to, when a judging result of the first judging sub-unit is the sum of elements in the line exceeds the maximum line rate, reallocate bandwidths for the elements in the line until an acquired sum of the elements in the line is smaller than or equal to the maximum line rate; and
the column reducing unit comprises: a second judging sub-unit configured to, for each column in the matrix acquired after the line reduction, judge whether a sum of elements in a lower triangular part of the column exceeds a difference between the maximum line rate and a preset amount of reserved bandwidths of the column, and a second allocating sub-unit configured to, when a judging result of the second judging sub-unit is the sum of elements in the lower triangular part of the column exceeds the difference between the maximum line rate and the preset amount of reserved bandwidths of the column, reallocate bandwidths for the elements in the lower triangular part of the column until an acquired sum of the elements in the lower triangular part of the column is smaller than or equal to the difference between the maximum line rate and the preset amount of reserved bandwidths of the column; and
a third judging sub-unit is configured to, for each column in the matrix acquired after the line reduction, judge whether a sum of elements in an upper triangular part of the column exceeds a maximum amount of authorized bandwidths of the upper triangular part of the column; and a third allocating sub-unit configured to, when a judging result of the third judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

16. The device according to claim 14, wherein the line reducing unit comprises: a fourth judging sub-unit configured to, for each line in a matrix acquired after the column reduction, judge whether a sum of elements in the line exceeds the maximum line rate; and a fourth allocating sub-unit configured to, when a judging result of the fourth judging sub-unit is the sum of elements in the line exceeds the maximum line rate, reallocate bandwidths for the elements in the line until an acquired sum of the elements in the line is smaller than or equal to the maximum line rate, wherein
the column reducing unit comprises: a fifth judging sub-unit configured to, for each column in the bandwidth request matrix, judge whether a sum of elements in a lower triangular part of the column exceeds a difference between the maximum line rate and a preset amount of reserved bandwidths of the column, and a fifth allocating sub-unit configured to, when a judging result of the fifth judging sub-unit is the sum of elements in the lower triangular part of the column exceeds the difference between the maximum line rate and the preset amount of reserved bandwidths of the column, reallocate bandwidths for the elements in the column until an acquired sum of the elements in the lower triangular part of the column is smaller than or equal to the difference between the maximum line rate and the preset amount of reserved bandwidths of the column;
a sixth judging sub-unit is configured to, for each column in the bandwidth request matrix, judge whether a sum of elements in an upper triangular part of the column exceeds a maximum amount of authorized bandwidths of the upper triangular part of the column, and a sixth allocating sub-unit configured to, when a judging result of the sixth judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago.

17. The device according to claim 13, wherein the authorization reducing module further comprises:

an authorization synthesizing unit configured to, when the bandwidth authorization matrix is determined, take a smaller one of values of an element at a same location in a matrix acquired after the line reduction and a matrix acquired after the column reduction as a value of an element at a corresponding location in the bandwidth authorization matrix;

the line reducing unit comprises: a seventh judging sub-unit configured to, for each line in the bandwidth request matrix, judge whether a sum of elements in the line exceeds the maximum line rate, and a seventh allocating sub-unit configured to, when a judging result of the seventh judging sub-unit is the sum of elements in the line exceeds the maximum line rate, reallocate bandwidths for the elements in the line until an acquired sum of the elements in the line is smaller than or equal to the maximum line rate;

the column reducing unit comprises: an eighth judging sub-unit configured to, for each column in the bandwidth request matrix, judge whether a sum of elements in a lower triangular part of the column exceeds a difference between the maximum line rate and a preset amount of reserved bandwidths of the column, and an eighth allocating sub-unit configured to, when a judging result of the eighth judging sub-unit is the sum of elements in the lower triangular part of the column exceeds the difference between the maximum line rate and the preset amount of reserved bandwidths of the column, reallocate bandwidths for the elements in the lower triangular part of the column until an acquired sum of the elements in the lower triangular part of the column is smaller than or equal to the difference between the maximum line rate and the preset amount of reserved bandwidths;

a ninth judging sub-unit is configured to judge, for each column in the bandwidth request matrix, whether a sum of elements in an upper triangular part of the column exceeds a maximum amount of authorized bandwidths of the upper triangular part of the column, and a ninth allocating sub-unit configured to, when a judging result of the ninth judging sub-unit is the sum of elements in the upper triangular part of the column exceeds the maximum amount of authorized bandwidths of the upper triangular part of the column, reallocate bandwidths for the elements in the upper triangular part of the column until an acquired sum of the elements in the upper triangular part of the column is smaller than or equal to the maximum amount of authorized bandwidths of the upper triangular part of the column, wherein the maximum amount of authorized bandwidths of the upper triangular part of the column is a difference between the maximum line rate and an actual amount of authorized bandwidths of a lower triangular part of the same column in a bandwidth authorization matrix received a period of a ring length ago;

wherein the authorization synthesizing unit comprises:
a scanning sub-unit configured to, after determining a value of each element in the bandwidth authorization matrix, scan the bandwidth authorization matrix line by line and column by column;

a first increasing sub-unit, configured to increase a value of an element at an intersection of a line in which a sum of elements in the line is smaller than the maximum line rate and a column in which a sum of elements in an upper triangular part in the column is smaller than a maximum amount of authorized bandwidths of the upper triangular part of the column, wherein after the increase, the sum of the elements in the line where the element locates is not larger than the maximum line rate, and the sum of the elements in the upper triangular part of the column where the element locates is not larger than the maximum amount of authorized bandwidths of the upper triangular part of the column;

a second increasing sub-unit, configured to increase a value of an element at an intersection of a line in which a sum of elements in the line is smaller than the maximum line rate, and a column in which a sum of elements in a lower triangular part in the column is smaller than a difference between the maximum line rate and a preset amount of reserved bandwidths of the column, and after the increase, the sum of the elements in the line where the element locates is not larger than the maximum line rate, and the sum of the elements in the lower triangular part of the column where the element locates is not larger than the difference between the maximum line rate and the preset amount of reserved bandwidths of the column.

18. A computer storage medium, the computer storage medium storing a computer executable instruction and the computer executable instruction being used for executing a dynamic bandwidth scheduling method which comprises:

when a target node serves as a master node, for each source node in the OBTN, when the target node allocates a timeslot for a connection from the source node to a destination node, preferentially selecting, by the target node, among timeslots in which there exists an Optical Burst (OB) where there has been no drop operation, a timeslot occupied by a destination node having a smallest hop count to a destination node configured currently; and when the target node serves as a master node, converting a timeslot allocation result into a bandwidth map and sending the bandwidth map to each slave node in the OBTN, the method further comprising:

when timeslots are allocated, configuring, by the master node according to a sorting sequence of nodes in an OBTN ring, the timeslots in order by respectively taking the nodes as source nodes starting from the master node;

wherein a configuration sequence of destination nodes under each source node is that: according to the sorting sequence of the nodes in the OBTN ring, the timeslots are configured in turn from a destination node having a small hop count to the source node to a destination node having a large hop count to the source node;

when a timeslot is allocated for a connection from the source node to a certain destination node, preferentially selecting, among timeslots in which there exists an OB where there has been no drop operation, a timeslot having a smallest timeslot number if there are more than two timeslots occupied by the destination node having a smallest hop count to the destination node configured currently.

* * * * *